United States Patent [19]

Case et al.

[11] Patent Number: 4,891,772

[45] Date of Patent: Jan. 2, 1990

[54] POINT AND LINE RANGE SENSORS

[75] Inventors: Steven K. Case; Robert E. Keil, both of St. Louis Park; Jeffrey A. Jalkio, St. Paul, all of Minn.

[73] Assignee: CyberOptics Corporation, Minneapolis, Minn.

[21] Appl. No.: 38,399

[22] Filed: Apr. 15, 1987

[51] Int. Cl.[4] .......................... G01C 3/08; G06F 15/20
[52] U.S. Cl. .................... 364/562; 364/561; 33/707; 250/201; 356/4; 356/375
[58] Field of Search ....................... 364/458, 561, 562; 356/3, 4, 9, 10, 11, 375, 358; 250/201, 202; 33/125 R, 125 A; 377/24; 350/420, 421

[56] References Cited

U.S. PATENT DOCUMENTS

| | | | |
|---|---|---|---|
| 4,531,833 | 7/1985 | Ohtomo | 356/4 |
| 4,560,271 | 12/1985 | Fumio | 356/4 |
| 4,575,237 | 3/1986 | Suzuki | 356/4 |
| 4,729,653 | 3/1988 | Kobayashi | 356/358 |
| 4,733,969 | 3/1988 | Case et al. | 356/375 |
| 4,746,790 | 5/1988 | Sorimachi | 250/201 |

FOREIGN PATENT DOCUMENTS

| | | | |
|---|---|---|---|
| 0202010 | 11/1984 | Japan | 356/4 |
| 0020111 | 2/1985 | Japan | 356/4 |
| 0189720 | 9/1985 | Japan | 356/4 |
| 1193567 | 6/1970 | United Kingdom | 356/4 |
| 2183418 | 6/1987 | United Kingdom | 356/4 |

OTHER PUBLICATIONS

Furman et al., Semiconductor Range-Finding System, IBM Technical Disclosure, vol. 16, No. 1, Jun. 1973.
Rezulski, Vignetting in Electro-Optical Distance Meters, Optics and Laser Engineering, vol. 18, No. 2, Apr. 1986.

Primary Examiner—Parshotam S. Lall
Assistant Examiner—Ellis B. Ramirez
Attorney, Agent, or Firm—Dorsey & Whitney

[57] ABSTRACT

High precision, non-contact sensors are disclosed which optically measure distances from the sensor head to the surface or surfaces under test. The modular design of the system allows a large selection of identically packaged sensor heads with differing ranges and resolutions. Built-in algorithms automatically adjust exposure time and process data to maximize accuracy for most applications. The sensor heads contain a laser diode source which features visible radiation as well as infrared radiation to facilitate set-up and use of the system. A unique optical system focuses the laser beam on a detector array. That data is processed to determine distance for point range sensors and surface profile for line range sensors. High speed algorithms are employed for reducing the data from the imaging array in the sensor head to meaningful range data. To compensate for widely varying surfaces of the software can vary the exposure and laser power to yield a dynamic range of $10^7$. The user can reject certain areas of the optical image and, therefore, eliminate erroneous readings that could be caused by multiple reflections from complex geometries. The operator can also select up to sixteen different heads, one at a time, for multiple measurements. Operator interface is conveniently provided through the keyboard to an attached computer system.

33 Claims, 19 Drawing Sheets

Fig. 2

| Fig.2a | Fig.2b |
|---|---|

Fig. 3

| Fig.3a | Fig.3b |
|---|---|
| Fig.3c | Fig.3d |

Fig. 4

| Fig.4a | Fig.4b | Fig.4c | Fig.4d |
|---|---|---|---|
| Fig.4e | Fig.4f | Fig.4g | Fig.4h |

POINT AND LINE RANGE SENSORS

FIELD OF THE INVENTION

The invention relates to laser based range sensors which make high precision optical measurements of surfaces having varying profiles and varying degrees of reflectivity. More specifically, the invention relates to non-contact sensors which optically measure the distance from the sensor head to the surface under test, either at a single measurement point for a point range sensor or linearly to determine a surface profile for a line range sensor.

High precision measurement devices of the past have been primarily of the contact type. Using electro-mechanical controllers, such as stepper motors, ruby tipped contact probes have been incrementally moved towards the surface to be detected. When the probe is deflected a relay opens or closes and a measurement is determined. Such electro-mechanical systems have a limited degree of precision which is obtainable with the probe and the more precise the measurement, the more complex and expensive the sensor system must be. Serious problems also occur when a soft or flexible surface is being detected since over-travel of the probe causes depression of the surface, and an inaccurate measurement can result.

Laser beams have also been used in the past to make precision measurements via triangulation. However, a large source-detector separation distance and magnification has been required to assure a sufficient movement of the detected laser beam across the light sensitive detector array. The combination of a large standoff distance required for part clearance in many applications, and high magnification cause expansion of the laser beam on the detector causing imprecise spot definition and low post-magnification light levels which must be detected by the laser based system. In an attempt to overcome these difficulties, very expensive optical systems have been provided and extremely complex calibration procedures are required to assure accuracy in result.

What has been needed has been a relatively inexpensive, flexible but highly accurate sensor system to make such point and line range measurements. The present invention addresses these needs.

SUMMARY OF THE INVENTION

The point and line range sensors which are discussed in more detail below use a unique optical system comprising a plurality of prisms which anamorphically magnify the reflected light beam in the plane of movement of the laser beam across the detector array corresponding to a shift in the object surface or the profile of the object surface being measured. This provides an anamorphic magnification on the order of 10 to 1 which permits a substantially reduced focal length for a given standoff distance and maintains the post magnification light levels at a substantially higher level than non-anamorphic systems.

A focusing lens focuses the magnified laser beam on a predetermined row of an N×M detector array, the output of which is processed with electronic circuitry for purposes of a point range sensor. A cylindrical lens is utilized in the source optics for profile sensing in the design of the line range sensor. In this case, all or a preselected number of the N×M elements are processed to obtain a surface profile for line range sensing.

Using the compact, inexpensive sensor heads, each with onboard resources including the multi-element detector, a highly flexible, operator controllable system can be established. Using multiplexing means a number of such sensors can be interconnected to a processor such as computers manufactured by the IBM Corporation and referred to as IBM PC/XT or AT. The invention includes interfacing hardware and high speed software for controlling the response of the optical systems, selectively controlling the optical system from which data is desired and for reducing the data from the imaging array in the sensor head to meaningful range data.

To compensate for widely varying surface reflectivities, the software can vary the exposure over a wide range. The system also provides a feature which allows the user to vary the light level of the source over a wide range. This gives the system a wide dynamic range on the order of 10,000,000:1. A user of the system may also reject certain areas of the optical image and, therefore, eliminate erroneous readings that could be caused by multiple reflections from complex geometries.

In a preferred embodiment the operator can select up to sixteen different sensor heads, one at a time, for multi-point or surface measurements. English and metric output formats are directly available. The operator may select "windows" within the detector array in order to reject erroneous data such as that from multiple reflections.

The modular design allows the large selection of identically packaged sensor heads to be utilized with differing ranges and resolutions.

It is an object of the invention to provide one or a plurality of miniaturized sensor heads, each using a plurality of prisms to anamorphically magnify the image of a laser illuminated point or line on a multiple element detector array.

It is an object of the invention to provide a visual display of data sensed by a line range sensor or a point range sensor.

It is an object of the invention to provide multiple sensor heads which are individually controllable by an attached computer resource.

It is an object of the invention to provide point and line range sensors which may be controlled by a readily available computer resource.

It is an object of the invention to provide non-contact metrology using a laser beam which provides both visible light for set up purposes and infrared light for detection and processing.

It is an object of the invention to provide point and line range sensors with wide dynamic range to handle varying degrees of object reflectivities.

It is an object of the invention to provide line and point range sensors which may be controlled by an independent processor to provide and enhance flexibility of use.

It is an object of the invention to provide point and line range sensors which are extremely accurate but inexpensive in cost.

The overall flexibility of the integrated system allows the point and line range sensors to be a unique and inexpensive problem solver for a host of research and quality control engineering application. These and other features and advantages of the invention will become obvious to those skilled in the art upon a review of the following description of the preferred embodiments, the appended drawings and claims appended hereto.

DESCRIPTION OF THE DRAWINGS

FIG. 2 and 2A thru 2B are schematic diagrams of the electronics in one of the remote sensor head.

FIG. 3 and 3A-3D are schematic diagrams of the multiplexer and driver units which enable operation remote from the computer resource.

FIG. 4 and 4A thru 4H are schematic diagrams of the electronics which enables the system to interface with the computer resource and which operates to control the sensor system and data collection from the sensor system.

DESCRIPTION OF THE PREFERRED EMBODIMENT

Figure 1:
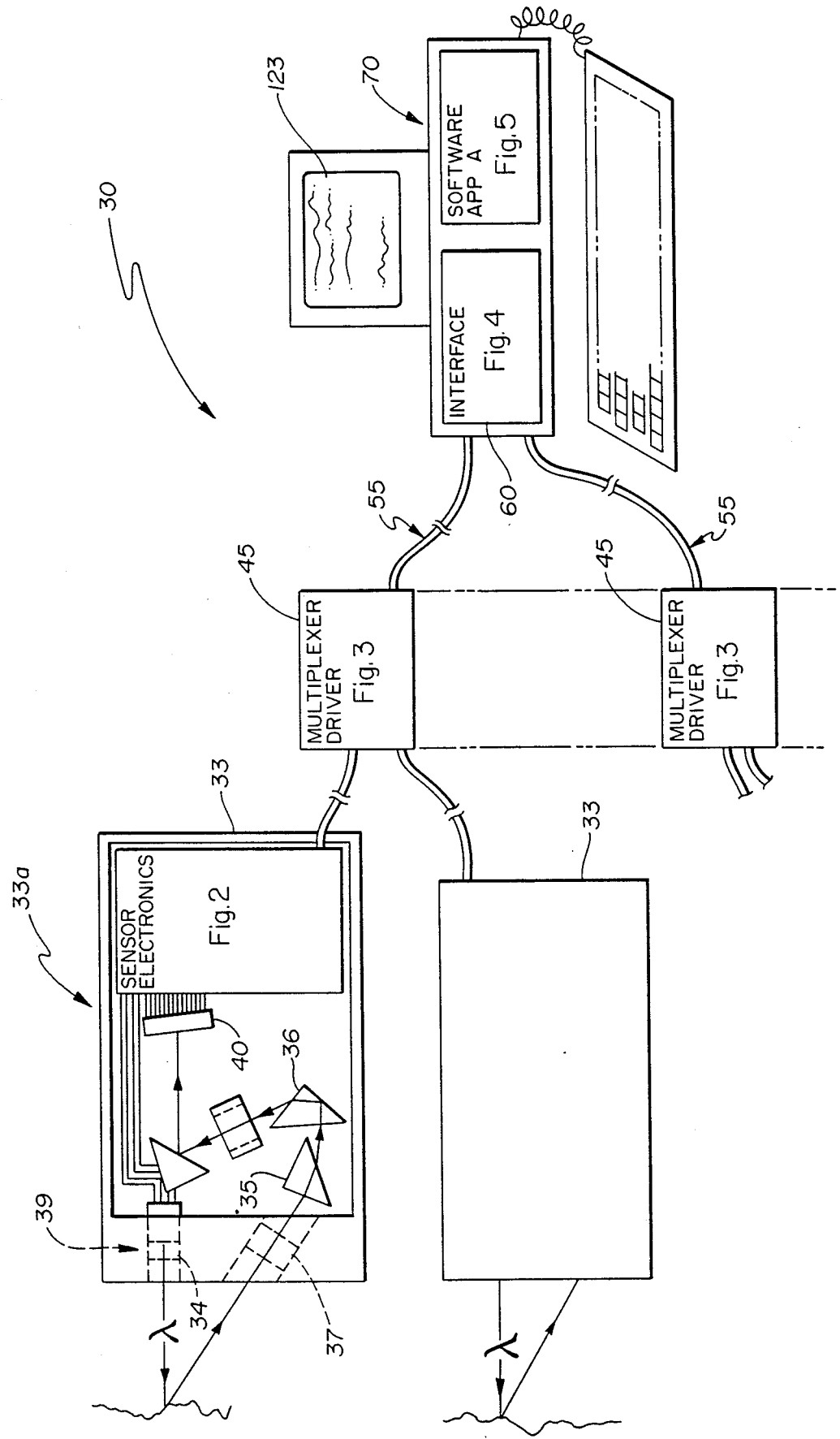
FIG. 1 is a composite environmental perspective, partly in block diagram form, showing a preferred emodiment of the optical system employed in both the line and point range sensor and showing how the system components relate to each other and to the following figures.
Figure 2A:
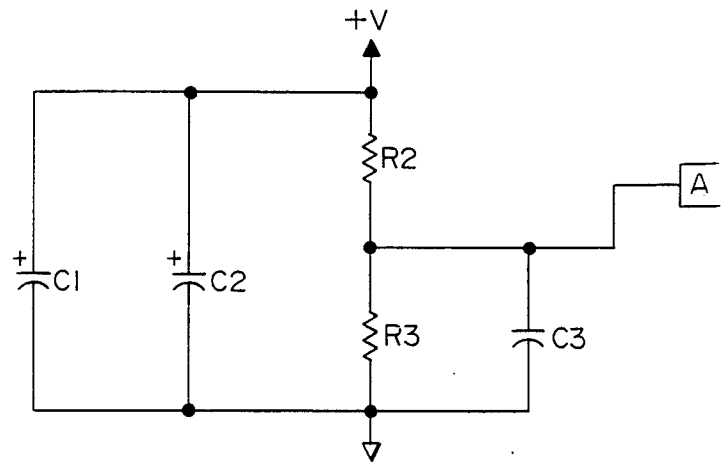
Figure 2A:
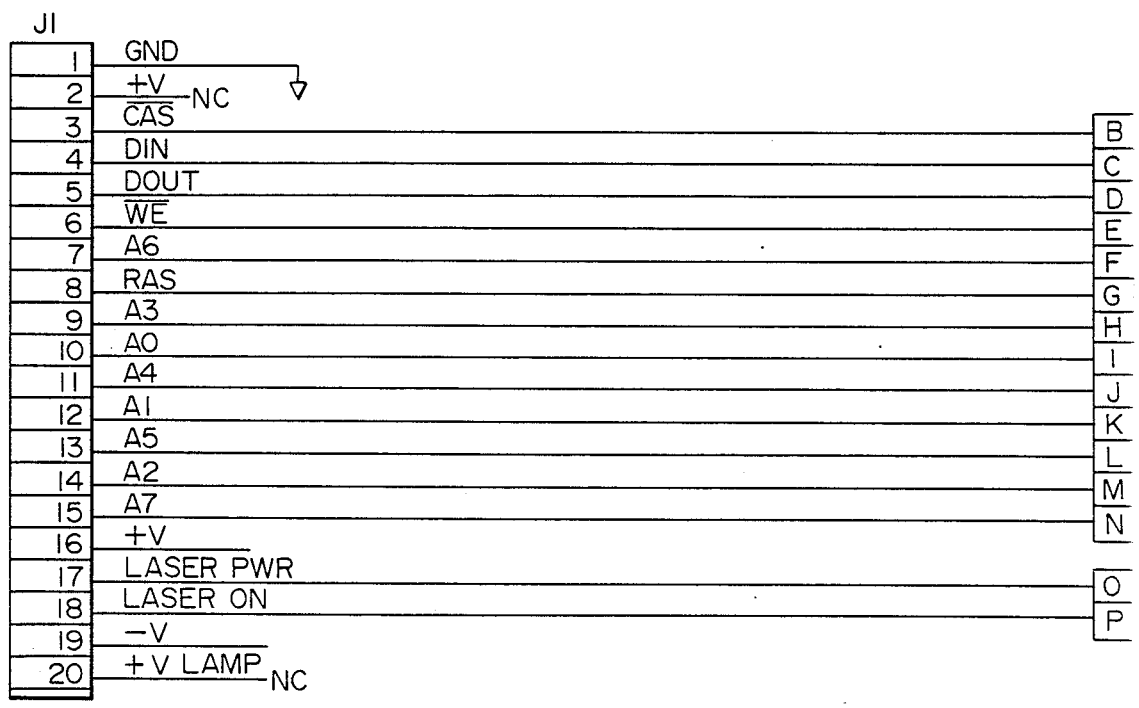
Figure 2A:
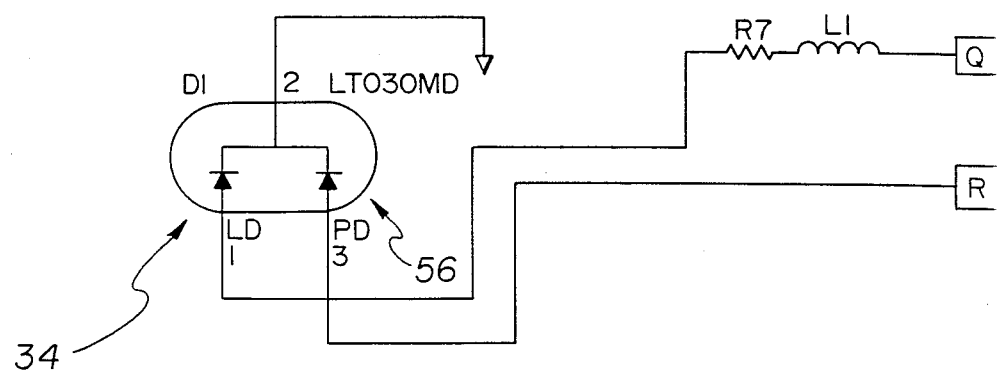
Figure 2B:
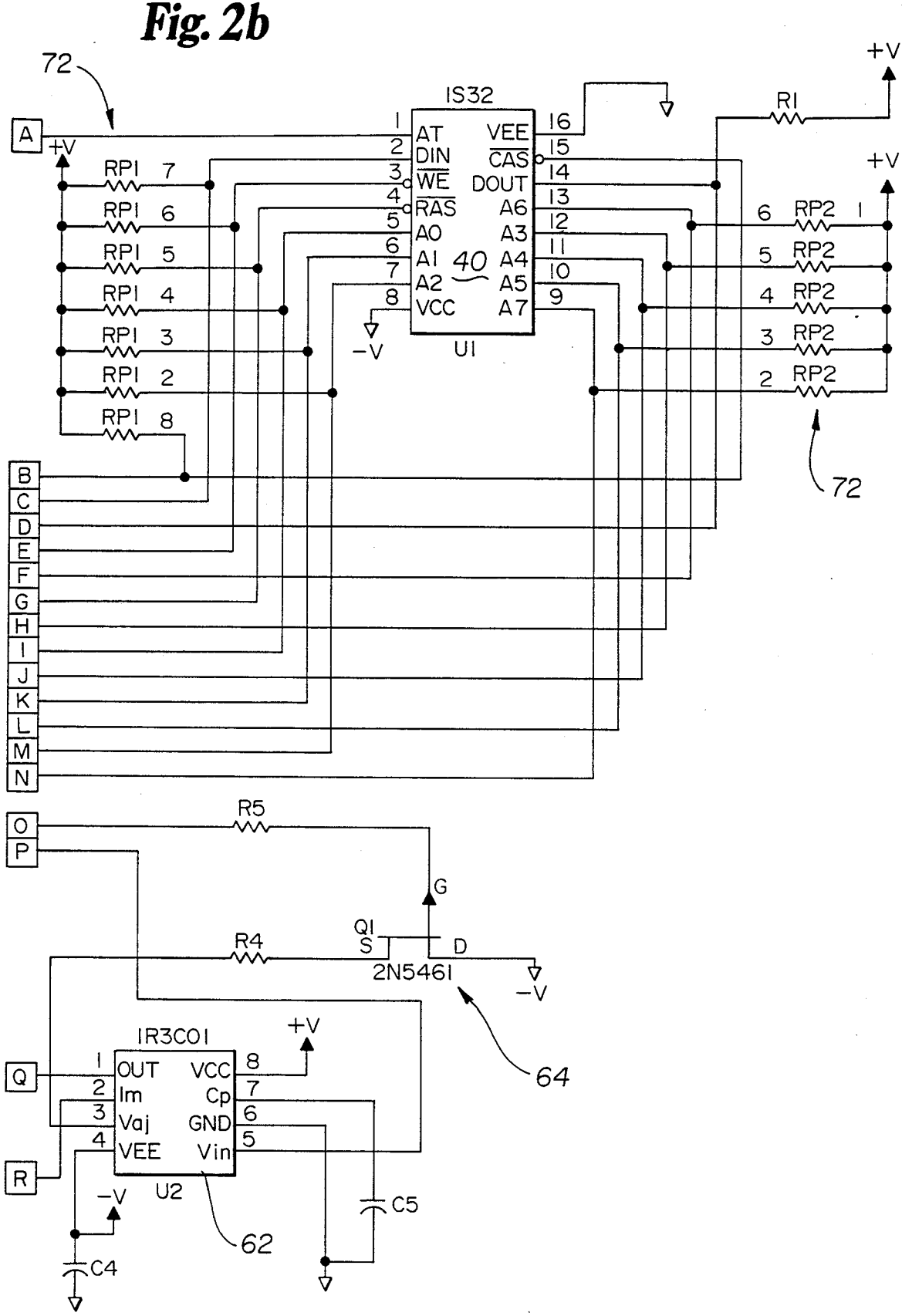
Figure 3A:
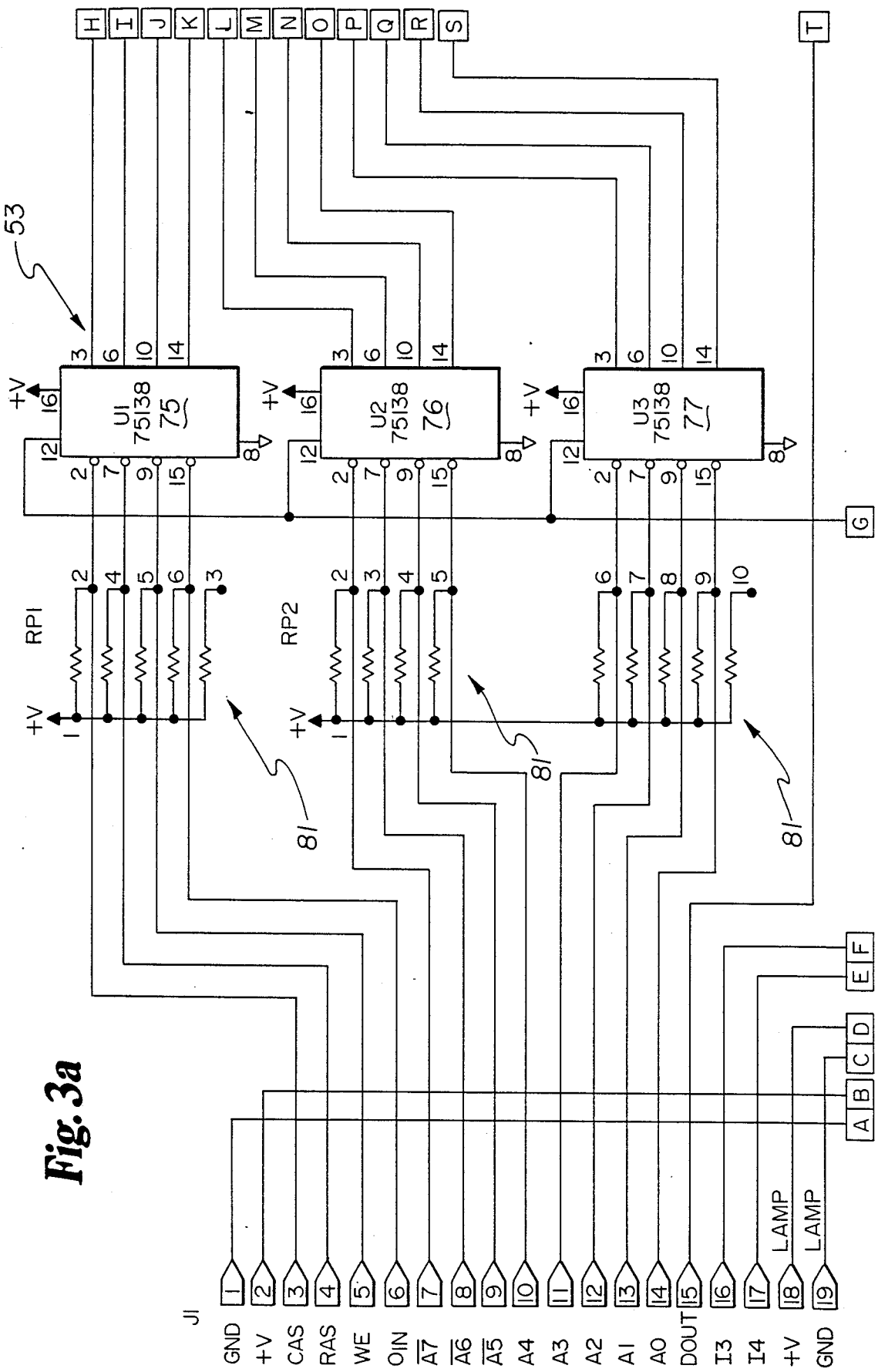
Figure 3B:
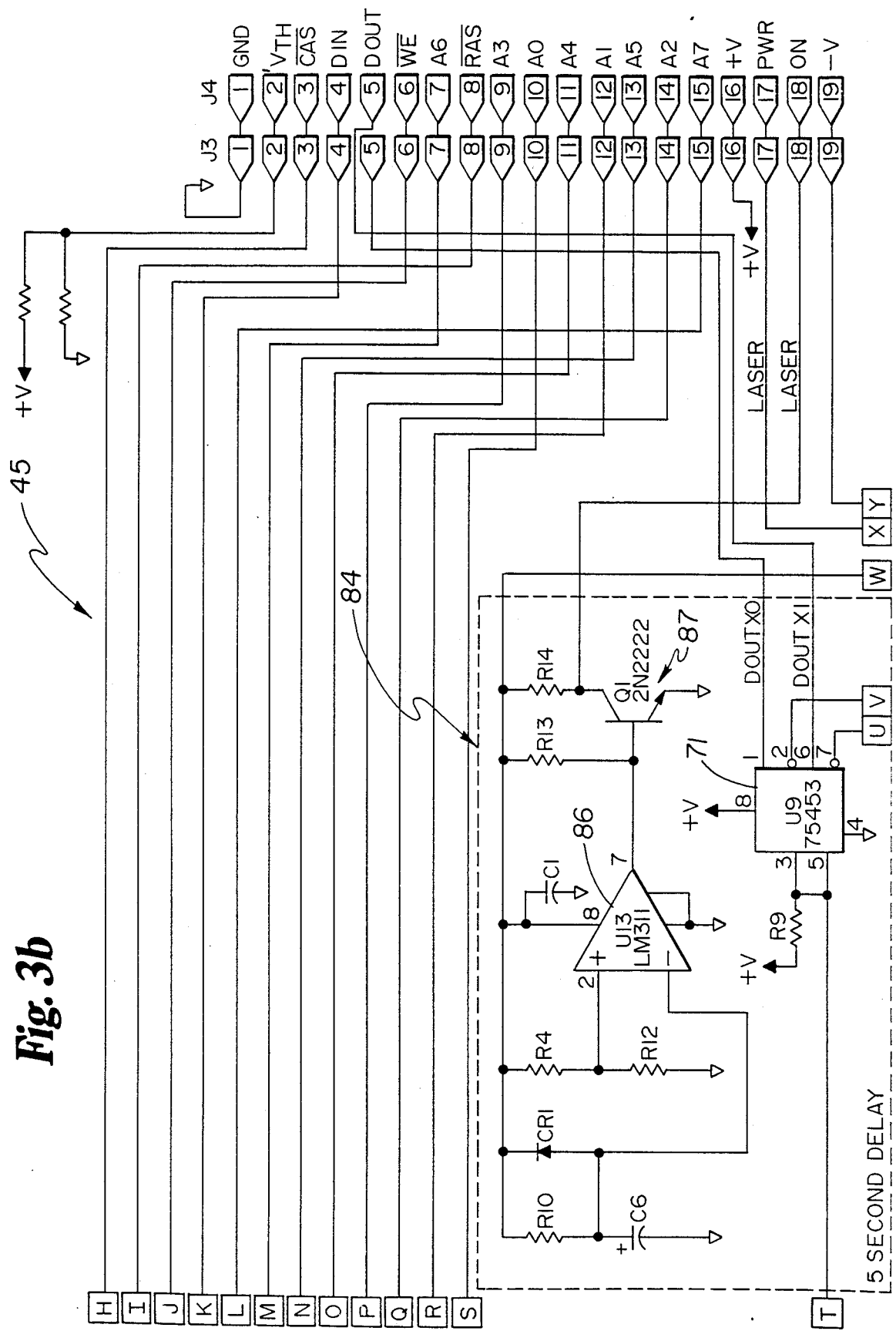
Figure 3C:
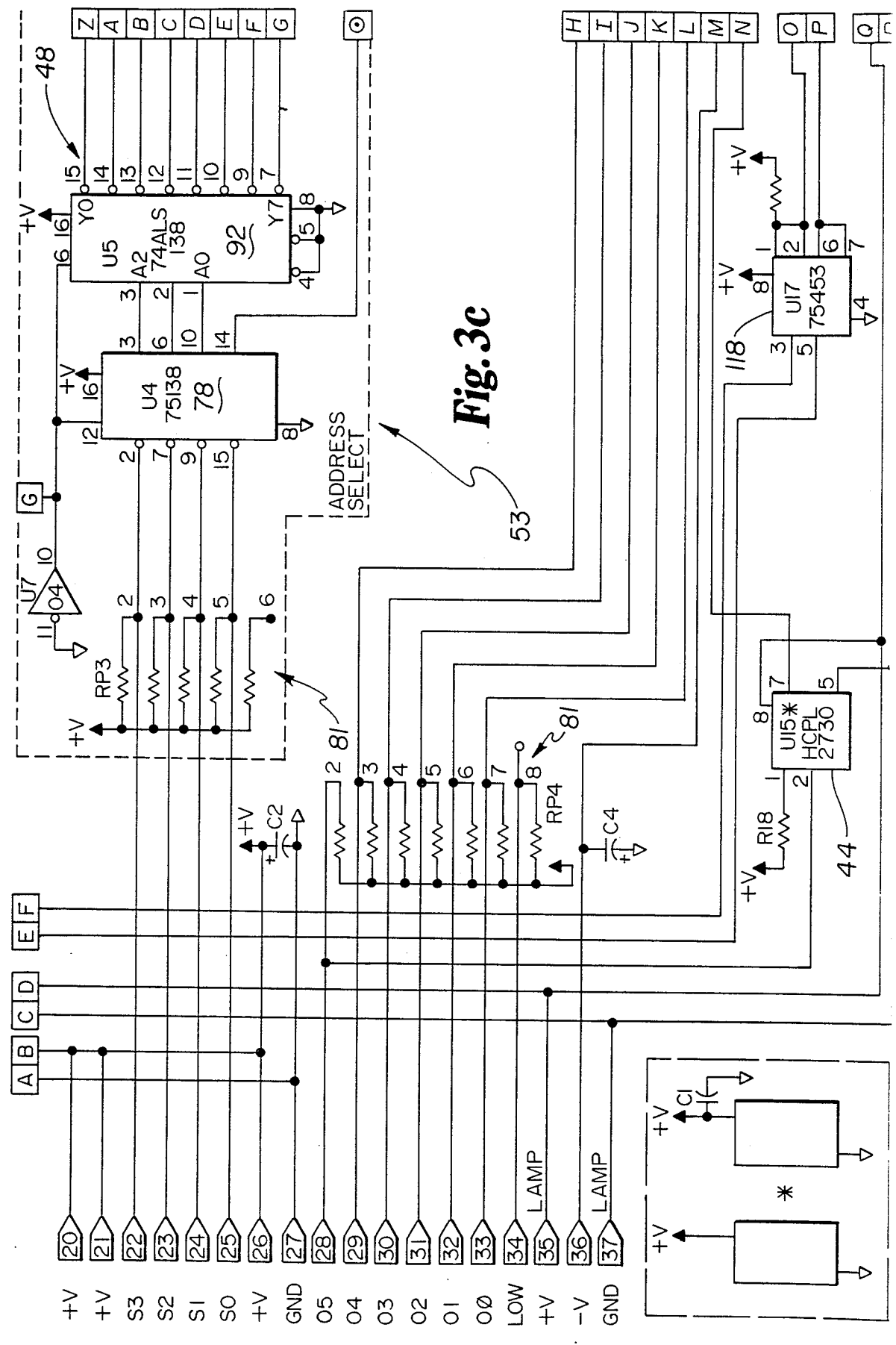
Figure 3D:
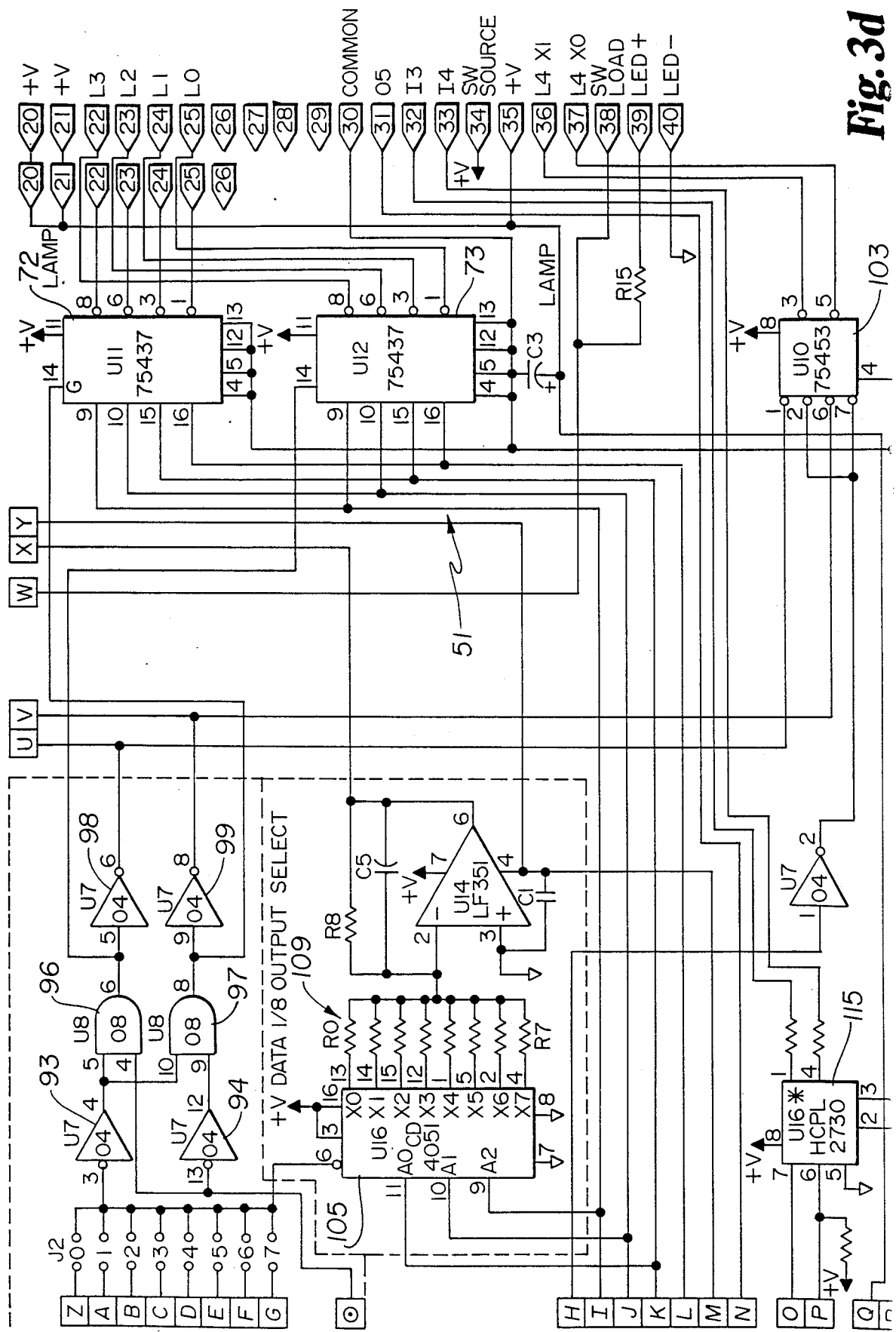
Figure 4A:
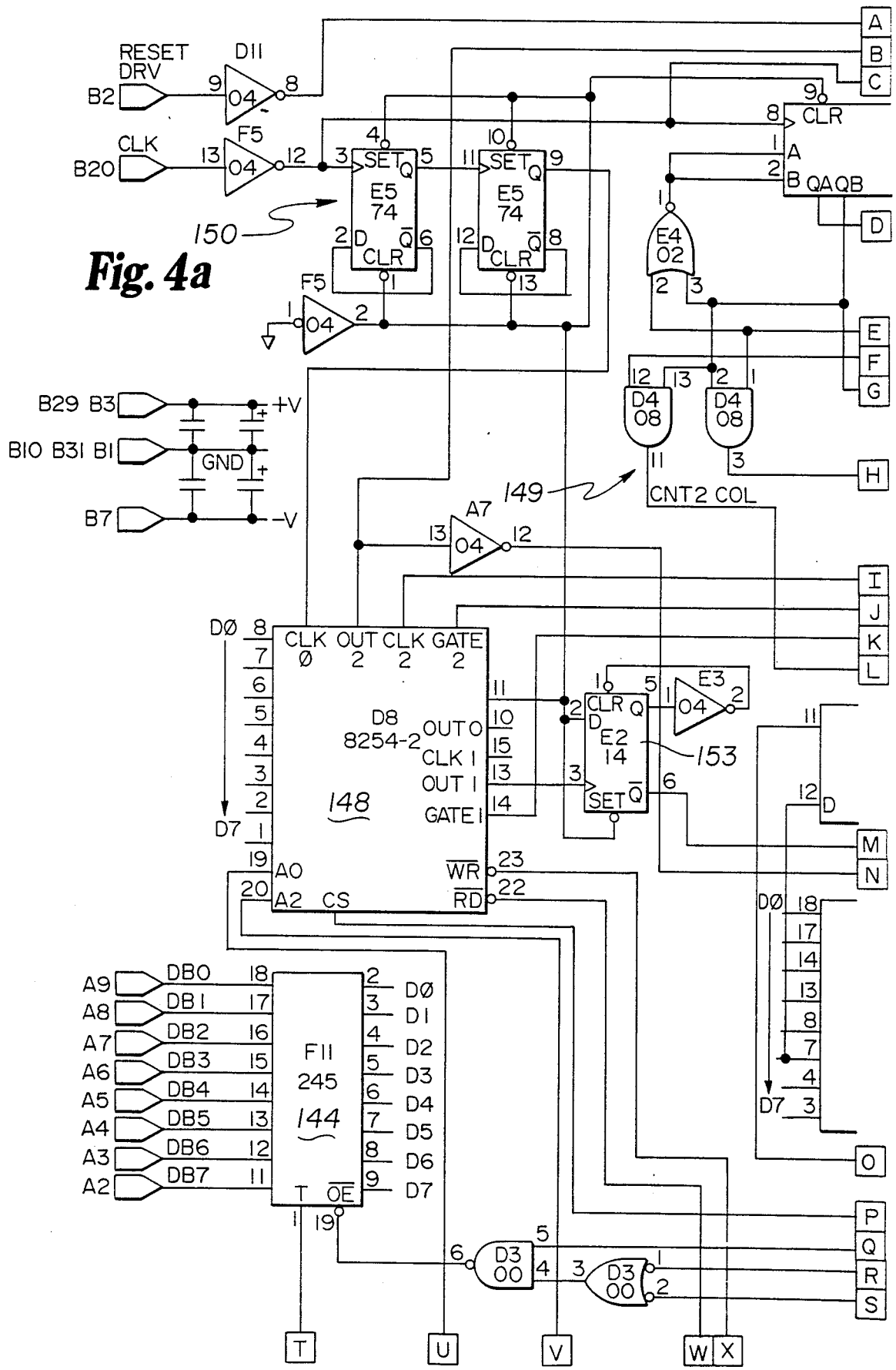
Figure 4B:
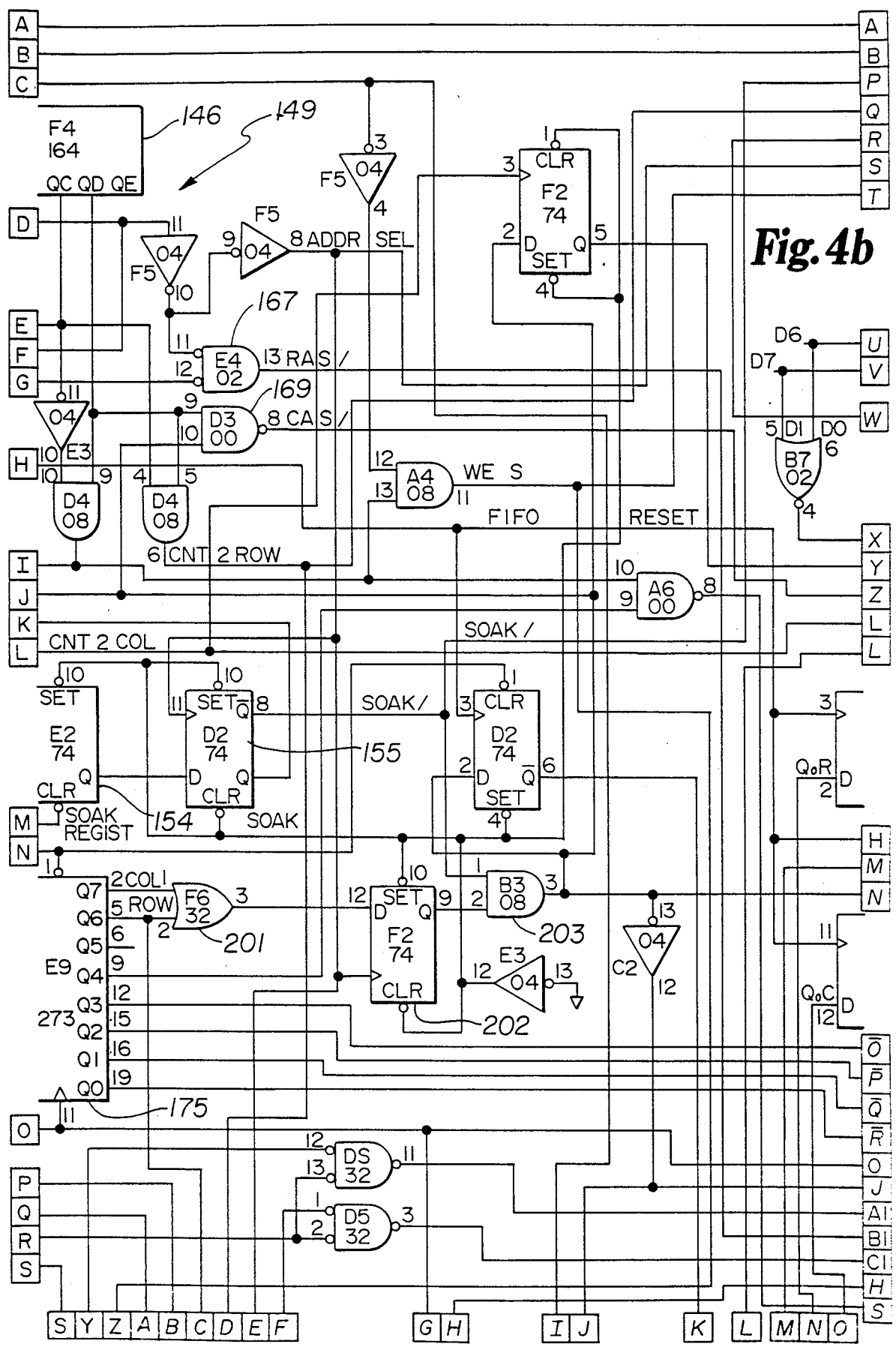
Figure 4C:
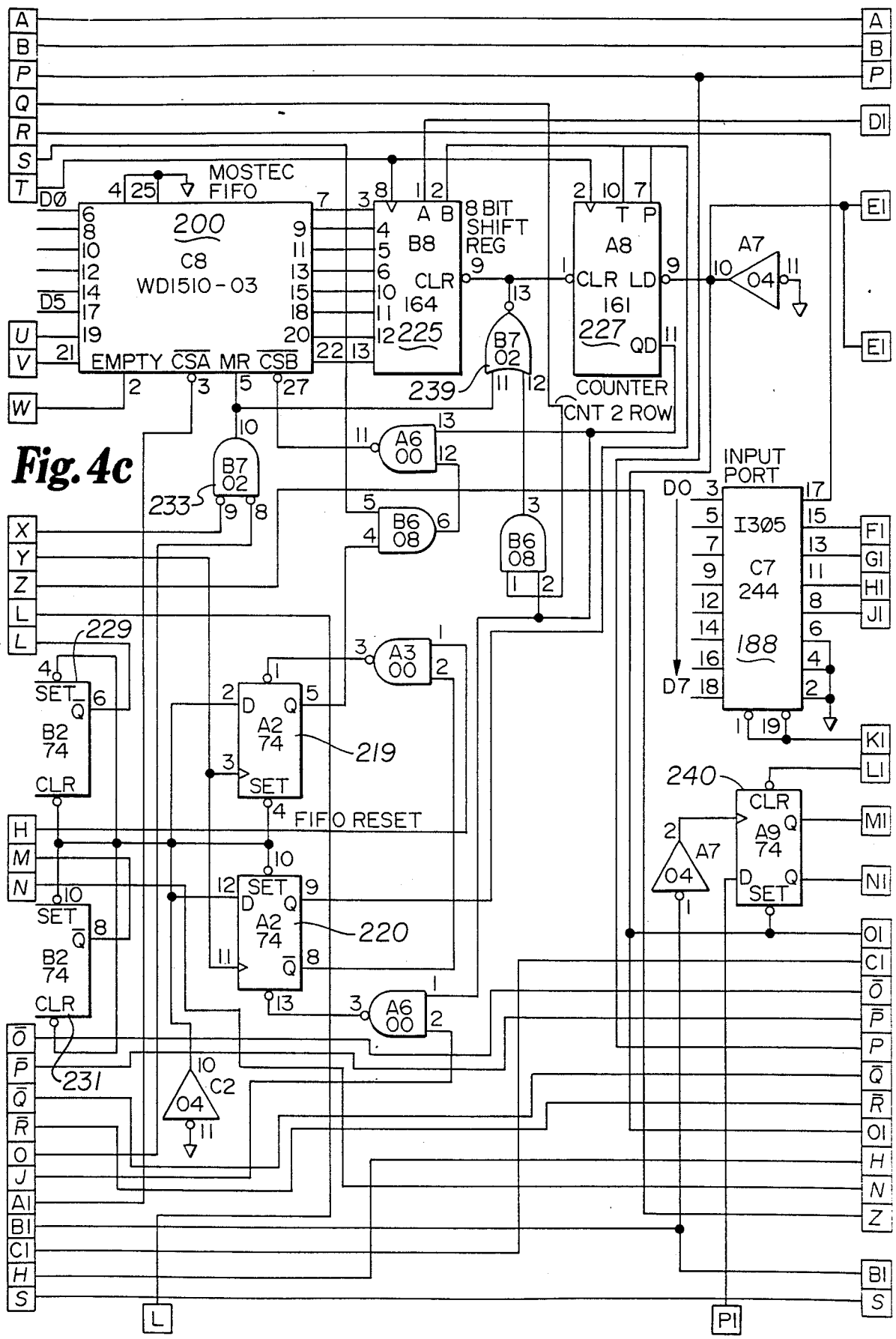
Figure 4D:
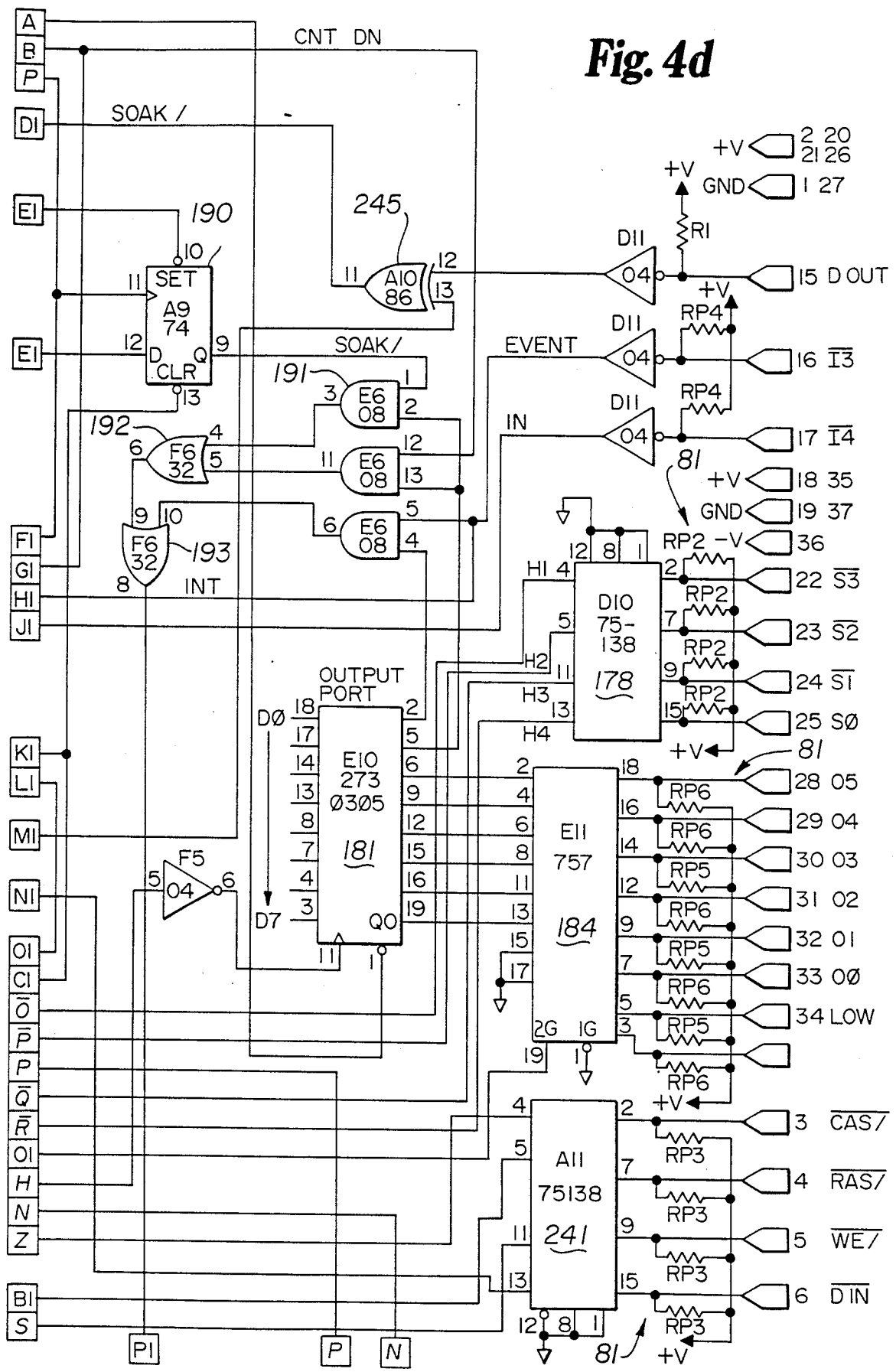
Figure 4E:
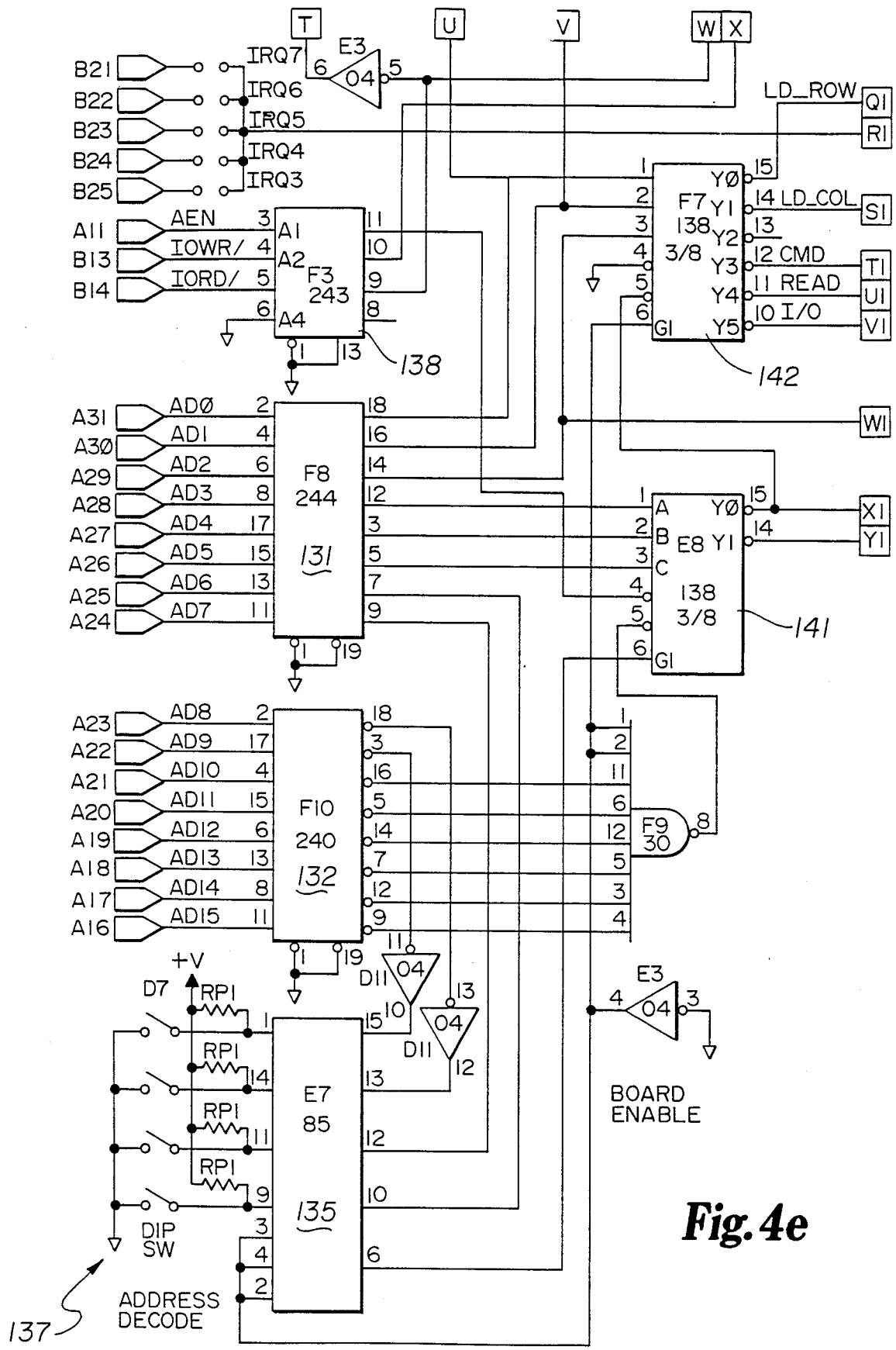
Figure 4F:
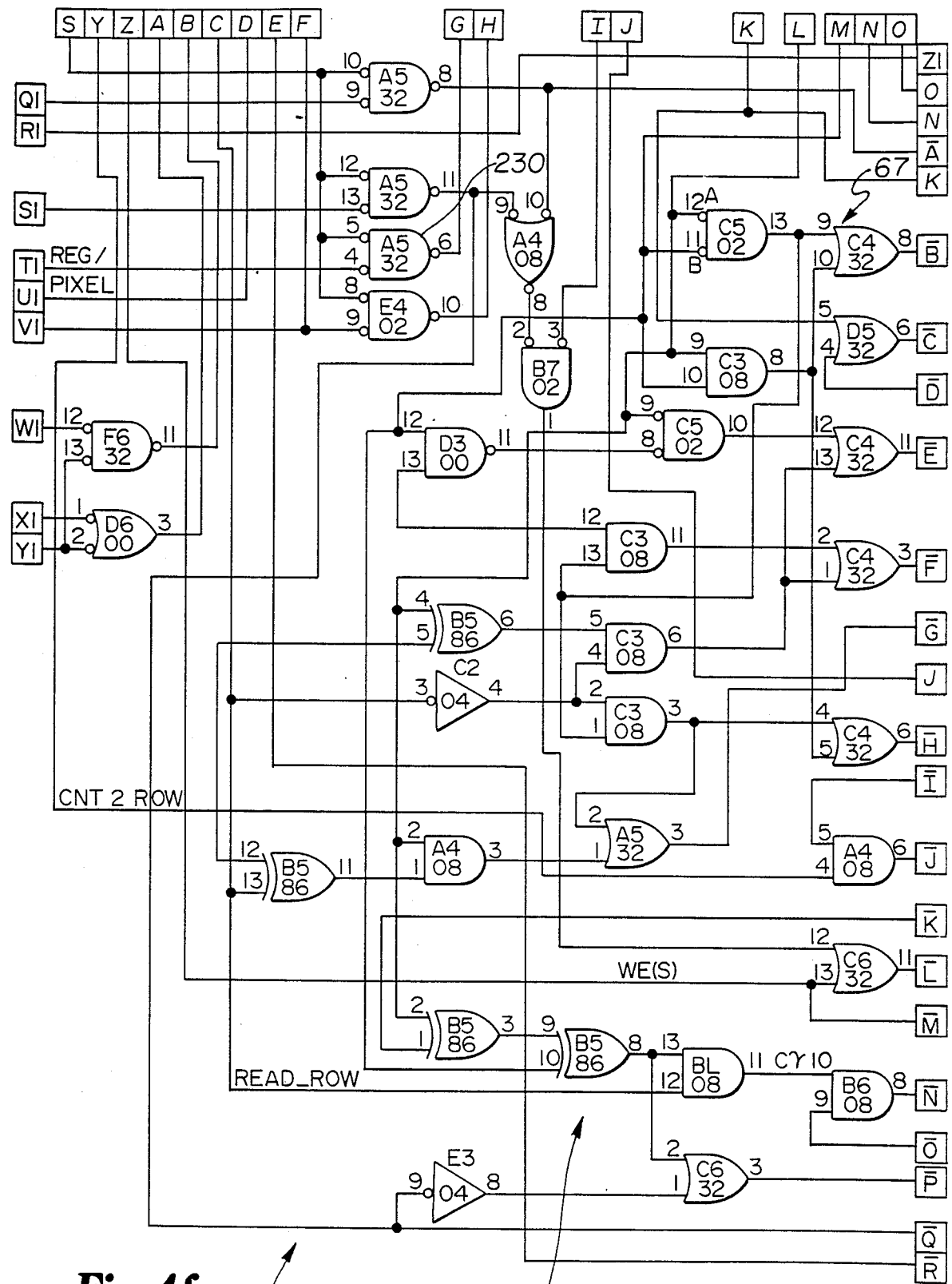
Figure 4G:
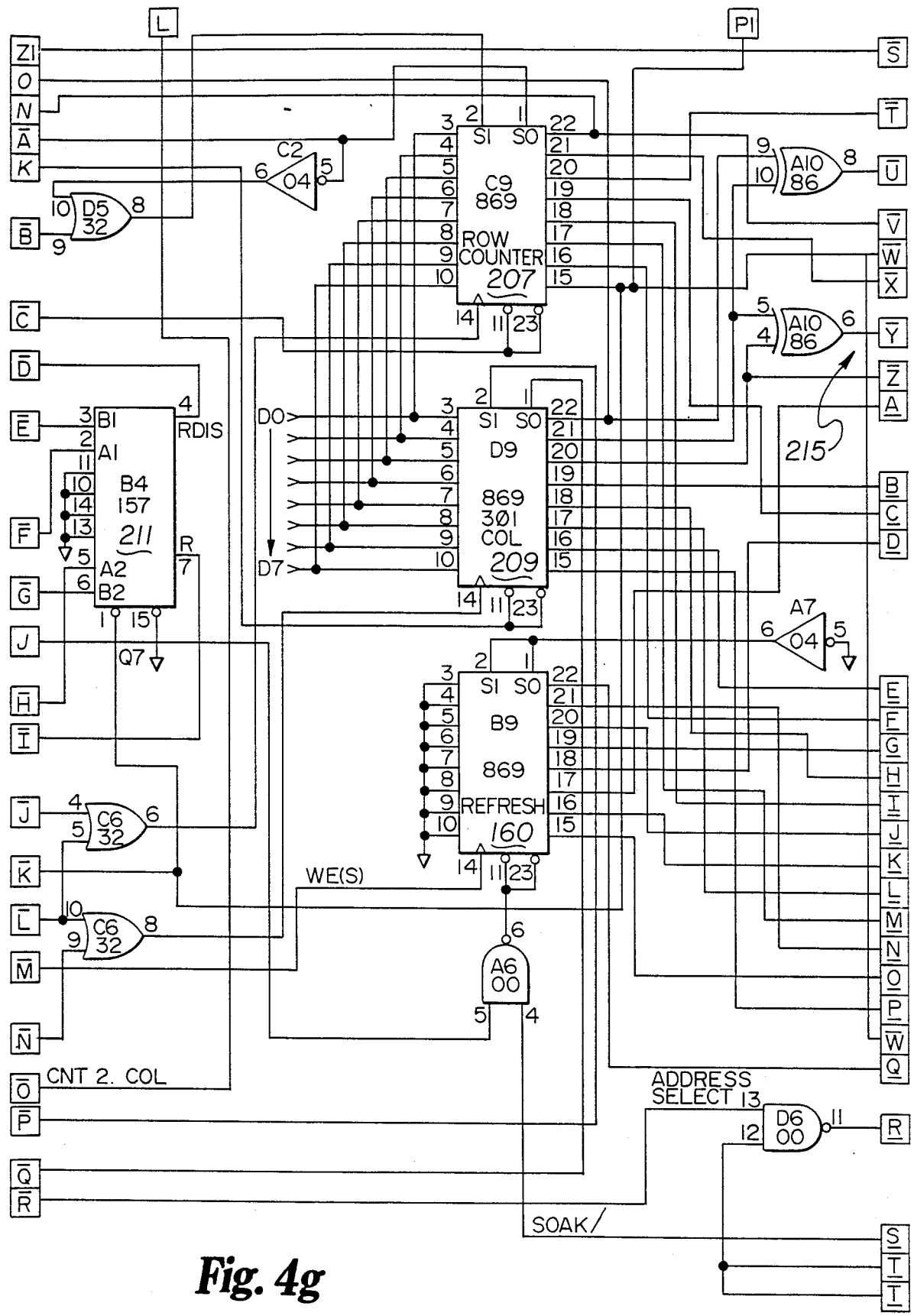
Figure 4H:
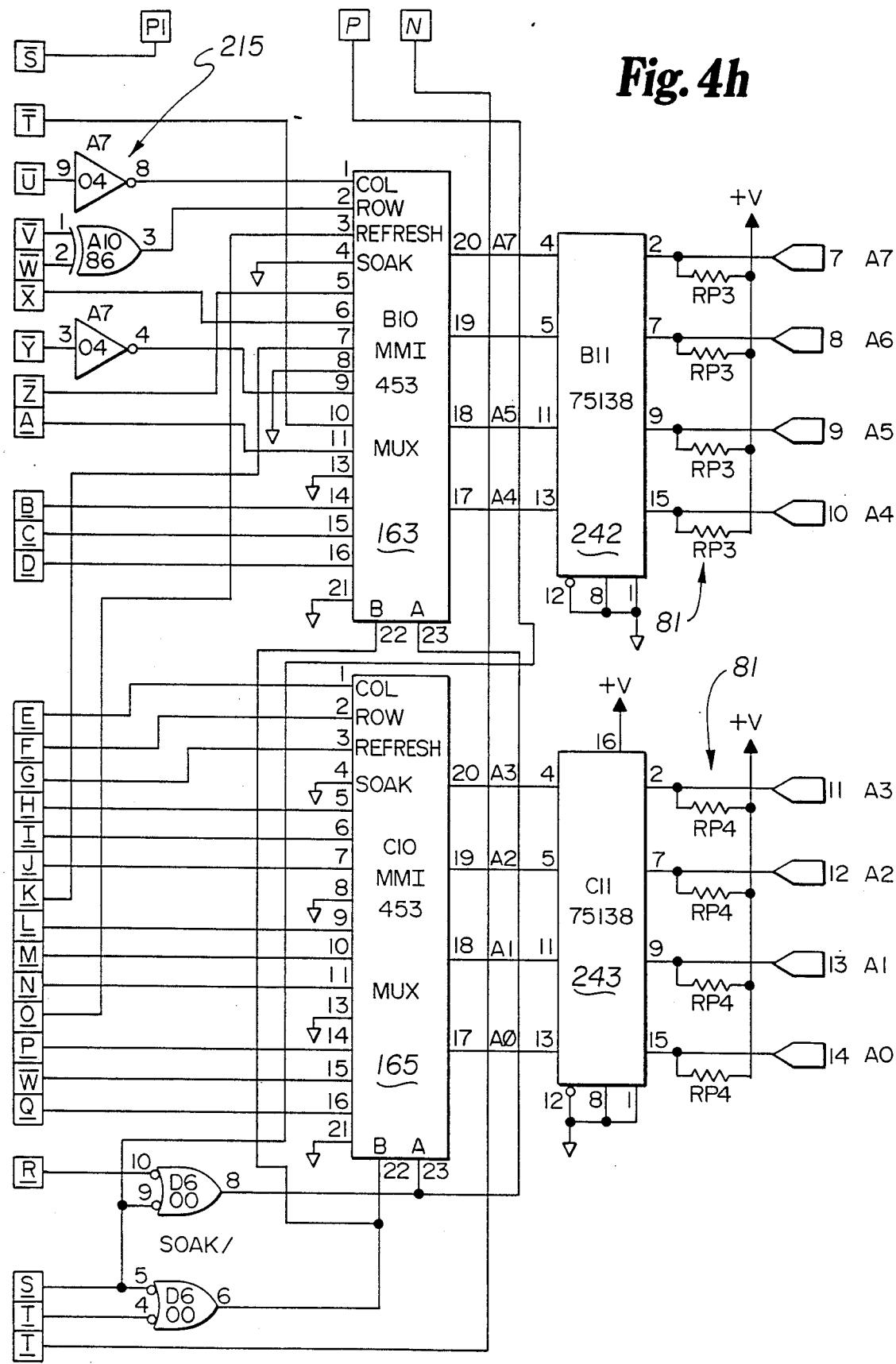

Shown in FIG. 1 is an overview of a system 30 which can be configured to be either a point or line range sensor, or both, constructed in accordance with the invention. Each of a plurality of sensor heads 33, such as the sensor head 33a shown in detail in FIG. 1, are designed to be used with the system 30. With the configuration shown in the figures, up to sixteen sensor heads 33, having differing ranges and resolutions and the heads being configured for point range sensing or line range sensing, can be utilized. It will be understood by those skilled in the art with appropriate modification any larger or smaller number of sensor heads 33 can be utilized and handled by the system 30.

Each sensor head 33 can preferably contain the unique optical system shown in FIG. 1 which is more fully described in U.S. patent application Ser. No. 07/038846, entitled *Use of Prisms to Obtain Anamorphic Magnification*, filed on the same date as this application, the disclosure from which is incorporated herein by reference. In summary, the preferred optical system uses prisms 35,36 for anamorphic magnification of a laser beam from a laser light source 34 which enables magnification in the direction of the beam variation on the order of ten to one. The prisms 35,36 are preferably shaped and oriented to produce substantially equal magnification and oriented in opposition to each other so that dispersive effects due to wavelength changes, which can occur as a result of frequency or temperature changes, are offset and any distortion in magnification through the optical system is offset as well. As a result the effects are minimized or eliminated and a highly accurate magnified image of the surface point or profile is produced on the detector array.

For range sensing a collimating lens 37 is used for the receiving lens which receives the reflected light from the surface to be measured. For line range sensing a cylindrical lens is incorporated into the source optics 39 which projects the surface profile onto a multi-element N×M detector array 40 through the prisms 35,36 so that the profile of the object surface can be determined. The preferred laser diode 34 utilized in the sensor heads 33 emits visible radiation as well as infrared radiation to facilitate setup and use of the system 30. Electronic operation of the detector array 40 and laser light source 34 are discussed in more detail with reference to FIG. 2.

A multiplexing board 45 discussed in connection with FIG. 3 is preferably used which selects one of a plurality of sensor heads 33, with two sensors 33 being connectable to each multiplexer board 45.

The multiplexer/driver boxes 45 can support up to two sensor heads 33 each and each contains multiplexer and driver electronics 48,51 for the heads 33, as well as special receiver electronics 53 which enable them to be located up to 20 feet from the interface board 60 in the computer processor 70. The intermediate box 45 is preferably connected to the interface board 60 by a flat ribbon cable 55 which has a standard length of ten feet and an optional length of twenty feet. Up to eight of these multiplexers/driver boxes 45 can be connected to the same interface board 60 and, therefore, drive up to a total of sixteen sensor heads 33.

The interface board 60 of FIG. 4 is shown to be compatible with computer systems 70 manufactured by the IBM Corporation and designated IBM PC/XT/AT. The interface board 60 controls each sensor head 33 and performs preliminary data reduction and provides a interface to the computer resource 70 which preferably contains the software shown in FIG. 5 as well as other software described below which is used in connection with the system 30 and any application routines which may be useful for the particular application of the user's business.

Referring now to FIG. 2 the electronics located in each sensor head 33 is shown and can be understood. The light source is preferably a laser diode 34 having both visible light for calibration and infrared light for detection and measurement. Packaged with the laser diode 34 is a photodetector 56, connected to pin 3. The photodetector 56 is used in a feedback circuit from a driver controller 62 which controls the light level of the laser diode 34. This feedback arrangement maintains the light level over varying temperature conditions.

A voltage control resistance established by a field effect transistor (FET) 64 provides the resistance in the photodetector feedback circuit to control the light level of the laser diode 34.

After the laser beam has been reflected from the object surface, it is refracted through the anamorphic prism 35,36 system and focused on a two dimensional array of photodetector elements 40. A preferred embodiment of the array is an optic random access memory (Optic RAM) consisting of a 64K dynamic RAM memory chip with the cover removed such as that sold by Micron Technology, Inc., manufacturer's designation MT4264, the configuration and operation which is described in U.S. Pat. No. 4,441,125, the disclosure of which is incorporated herein by reference. This detector utilizes a dual 128 times 256 element array which provides 32,768 light sensing elements per array for a total of 65,536 total elements. The dual arrays are MOS devices. Consequently, after soak, the voltage value of the MOS capacitors are below the threshold value if the capacitor was exposed to a sufficient light intensity indicating a white pixel. When referring to D-out, black is logical 1 for row zero through 127 and logical zero for rows 128 through 255.

The elements in the array are offset one from the other. By scanning the elements in a serpentine manner with address descrambling logic 67 which will be discussed in connection with FIG. 4 a resolution of 512 by 128 can be achieved. Attached to the detector chip 40 are pull up resistors 72 which provide noise suppression to match the impedance of the lines that are driving and communicating wtih the chip 40.

Since the detector 40 is a dynamic RAM, each sensing element may be uniquely addressed. The sixteen address bits are entered (multiplexed) eight bits at a time using the RAS signal or line to latch the first eight bits and the CAS signal or line to latch the latter eight bits. A single bit data output is provided on the D-out line when the detector 40 is being read.

As will be discussed in conjunction with the logic of FIGS. 4 and 5, for point range sensing a single double row line is addressed. For line range sensing one or both element arrays can be processed for the surface profile.

Referring now to FIG. 3, the multiplexer driver boxes 45 are shown and can be discussed. A main feature or function of the boxes 45 is to provide sufficient drive current for the signals so that the processing resource 70 can be up to 20 feet away from the sensor heads 33.

FIG. 3 is a schematic diagram of the intermediate module component shown in FIG. 1 referred to as a multiplexer/driver board or box 45 which enables the separation of the sensor head 33 from the host processor 70 by distances of up to 20 feet and also performs certain control functions. Distance separation is achieved with line drivers 71–73 and line receivers 75–78 which enable communications between the sensor head 33 and the processor 70 without distortion of signals. Each has associated pull up resistors 81 to match the impedance of the connected lines, to avoid reflections and the like.

Safety features are also included including a remote interlock feature which is required by federal law. The remote interlock is achieved with a relay (not shown) which interconnects the five volt laser 34 source voltage on pin 34 of jack 4 to pin 38 of jack 4. The laser 34 source voltage through the relay is applied to a five second delay circuit 84 which includes operational amplifier 86, associated transistor 87 and related electronics. The five second delay occurs upon applying power from pin 38 to the laser diode 34 circuit and the time constant is provided by resistor R10 and capacitor C6. As shown in the drawing, the output from the collector of transistor 87 connected to the "laser on" signal which is applied to the laser diode 34 as shown in FIG. 2.

As explained above, up to sixteen sensor heads 33 can be supported with the configuration which is being described as the preferred embodiment. This is achieved with a line receiver 71, a decoder/demultiplexer 92 and associated inverters 93, 94, 98,99 and AND gates 96,97 which perform an address select based on the address of the board 45, which is preferably established by jumper interconnection. Lines S1–S3 on input pins 22–24 of jack 1 select one of the eight multiplexer driver boards 45. The fourth line, S0 on pin 25, gives an odd/even head 33 select on the box 45 to choose one of the two separate sensor heads 33 which are connected. In other words, if the seventh multiplexer/driver box 45 was addressed the S0 signal would select either head 15 or head 16. As shown in the schematic, the output of the AND gates 96,97 are connected to the line drivers 72,73, one for each head 33. The output of the inverters 98,99 are connected to a first demultiplexer 103 to choose the laser sensor X0 or X1 to be processed. The output of the inverters 98,99 is also connected to a second demultiplexer 71 which passes the data out for the selected sensor head X0, X1.

A one-of-eight decoder 105 is used with three input lines to adjust the laser 34 power. This enables the laser 34 to operate over a very wide dynamic range, on the order of 1,000:1, to accommodate different materials. For example, if the laser is illuminating a transparent glass surface, very little light will reflect back from the glass and preferably the laser 34 operates at high power so that enough light is reflected back to the detector 40 surface to accurately see the spot. If on the other hand the surface is white bond paper with a high degree of reflectivity, very little light is needed to saturate the detector 40 capacitors. A first means for achieving this dynamic range includes the data word connected to the one of eight decoder 105 which selects resistors 109 of varying value, the outputs of which are connected to operational amplifier 111 which is connected to the "laser power", pin 17 for each of the laser diodes 34, jacks 3 and 4. Referring to FIG. 2, the laser power lead is connected to the gate of the FET 64 to adjust the power supplied to the laser diode 34.

A second means is also provided to even further enhance the dynamic range of the system 30, on the order of 10,000:1. The exposure time of the light beam on the detector array 40 will vary the amount that the MOS capacitors are discharged. If the exposure time is increased, sensitivity of the detector array 40 is concomitantly increased. Therefore, for very low light levels a longer exposure time can be chosen. For high bright highlighted densities, a shorter exposure time can be chosen. These two means give the system 30 and a very wide dynamic range, on the order of 10,000,000:1.

Provision is also made for control signals to be communicated between the processor 70 and the sensor head 33. Single bit drivers 114, 115 are opto-isolators. Driver 118 is a high current driver. The output from driver 114 designated "05" is an output signal. Bits from drivers 115 and 118 are input signals and can be used as a processor interrupt or the like. Combining these features, a handshake can be achieved when communicating between the boards 45,60 and other uses will be apparent to those skilled in the art.

Output drivers 72,73 in addition to selecting which data is going to be read by controlling the light source to the odd or even sensor head 33 that is connected to the multiplexer driver box or board 45, can also be used to drive four sets of lights, L0–L3 which can be advantageously used for obtaining a two dimensional image of an object surface.

Referring now to FIG. 4, the modular interface board 60 is shown and can be understood. The interface board 60 of FIG. 4 responds to the control signals from the processor 70 which can be an IBM personal computer or any other computer resource which can run the control and application software. The interface board 60 responds to the control signals for head 34 selection and, through connections made through the multiplexer driver board 45 to the detector array 40 and the laser diode 34 system, synchronizes and sequences the operation of the selected sensor head 34. The interface board 60 also processes the information from the detector array 40 and passes it through to the computer resource 70 for calculation and display on the associated CRT screen 123.

Complexity is added to the resource board 60 shown because of the physical topography of the dynamic random access memory (RAM) which is used as the optical detector 40. The physical layout is nonuniform. The array consists of an upper array with 128×256

MOS elements which are laid out in a somewhat serpentine or offset distribution. A lower array, also with 128×256 pixels or optic elements, has an output that is the complement of the upper array. Consequently, exposed elements in the upper array will cause D-out to be zero or five volts depending on the exposure; the lower array will cause D0out to be five volts or zero volts for the same exposure. The complexity of the topographical layout, while adding complexity to the processing of data and reading of data, can also be advantageously utilized by reading two rows (or columns) as a line, thereby yielding an effective detector array of 512×128 picture elements which doubles the resolution of the system in one direction, which is a preferred embodiment of the invention.

While a row oriented system will be described in conjunction with the preferred embodiment it will be understood by those skilled in the art upon a review of the schematic diagram that the electronics are configured in a manner whereby columns could just as easily be used for purposes of the invention.

Addressing of a particular one of the sixteen sensor heads 33 is achieved by first addressing the board 60 wiht high order address bits AD6–AD9 connected to pins A25–A22. These inputs are connected through buffers 131 and 132 to a comparator 135 which compares the address requested by the computer 70 to a board address which is entered on four dual in-line pin (DIP) switches 137. An address enable is also connected on pin A-11 to buffer 138 which is connected to a three of eight decoder 141. Two such three of eight decoders 141, 142 are used to address board 60 components. Lower order bits AD0–AD5 connected to pins A31-A26 are used to connect component addresses for setting up the board 60 for operation and initiating and concluding the processing.

Data transfer between the computer 70 and the detector array 40 through this board 60 is achieved through a bi-directional data buffer 144 which is connected to the data bus of the computer resource 70. The direction of the data buffer 144 is determined by the IO write and IO read signals connected to pins B13 and B14 and connected to the data buffer 144 through buffer 138.

There are four modes of operation for the dynamic RAM 40. A "refresh cycle" is in operation until data is processed from the RAM. The refresh cycle sequentially steps through each row and restores each pixel to five volts or zero volts depending upon the sensed condition of the pixel location during the refresh cycle. Exposure of the RAM 40 to the laser beam is referred to as the "soak" mode of operation. The soak mode is followed by a "read" mode which preferably reads a precalibrated line if the sensor head 33 is configured as a point range sensor or sequentially reads a series of lines if the sensor head 33 is configured as a line range sensor. It will be understood by those skilled in the art that since a dynamic RAM is being utilized any pixels can be selectively chosen by utilizing an appropriate start count for rows or columns and a length count for the amount of pixels to be read. By so doing, unwanted images such as multiple reflections from upper and lower surfaces of transparent glass can be excluded from the usable data which is received and processed by the processor 70. Finally, a "read/modify/write" mode of operation can be chosen. Using this mode of operation, after the reading has been taken each capacitive pixel element is change to a "dark" charge so that the detector 40 is immediately ready for another exposure.

Timing and sequencing of operation of the board 60 is synchronized with the bus oscillator on pin B30 from the computer resource 70 bus. Timing includes a shift register 146, a timer chip 148 and flip-flop dividers 150. The configuration of the shift register 146 depends on the bus oscillator rate which is fixed at fourteen MHz and then becomes seven (7) MHz after being divided by flip-flops 150. The shift register 146 with associated logic 149 then decodes the sequence of events and generates the timing signals for operation of the optic RAM 40. Therefore, operating like a RAM controller 146, 149, it generates row address signals, column address signals, write enable signals and similar signals generated to be sure that the circuitry is synchronized with the optic RAM timing.

Similarly, a timer chip 148 is provided having three internal counters. The counters are set up under software control and can be set to either modulo-N counters or one shots. For the soak or exposure mode, counters 0 and 1 are utilized and using a series of latches 153–155, the exposure time is controlled with latch 154 serving as a soak register and latch 153 controlling the time out which is gated from the latch 155 which is connected to pin 14 the gate input.

For refresh, which continuously runs on the optic RAM chip 40 unless it is being soaked or read, a refresh counter 160, which is a modulo-N counter, is connected to two multiplexer chips 163 and 165 which select the modes of operation for the optic RAM chip. The refresh counter 160 causes refresh signals to occur on pin 3. At the same time, the row address enable is cycled through the chip 40 from shift register 146 through NAND gate 167. Similarly, the column address enable is similarly cycled through NAND gate 169.

To soak or expose the chip 40, a command register 175 is addressed from pin 12 of the address select 142 and data on input lines D0–D7 select which multiplexer board 45 is going to be utilized with signals H1–H3 and, using signal H4, which sensor 33 connected to that board 45 is to be utilized. The signals are connected through line driver 178 to the multiplexer boards 45 for sensor 33 selection. As also shown, the column and row read signals and the "read/modify/write" mode is also established with command register 175. In many applications it may be preferable to use two quad flip-flops, one for sensor select handling lines H1–H4 and the second for read commands, rather than the octal D-flip-flop 175 shown in FIG. 4.

In a similar manner, the output port 181 is addressed with the three to eight decoder 142 and, with data connected on data lines D0–D7, the power level of the selected laser 34 is established with signals 00–02 which are connected from the line driver 184 through the one of eight output select 92 on FIG. 2 to the field effect transistor 64 which controls power to the laser 34. The laser 34 is turned-on after the five second delay circuit 84 times out.

The exposure time is entered by selecting the timer chip 148 and loading into the timer chip 148 with data lines D0–D7 the exposure time desired. Soak is accomplished by refreshing the first row only of the optic RAM 40. This allows the remaining capacitive pixel elements hit by the laser beam to discharge when the laser beam is focused on the chip 40.

Soak or exposure can be terminated in a number of ways at the election of the user of the system. Under software control the soak time can be loaded as counts into the timer 148 and with the soak register 154 and soak time out register 153 and associated latch 155 cause the soak time to count out. The software can also be set up to interrupt on the time out. Consequently, the end of the soak signal from input port 188 on pin 15 can be used to generate an interrupt through latch 190 and gates 191–193 which is connected as interrupt IRQ5 on pin B23. It is also possible to connect both the soak command and a read row command to the mode registers 163 and 165 so that when the soak is complete the system 30 will begin reading data automatically after the soak or exposure is completed.

The circuitry both causes the selected pixel elements to be read in a serpentine manner according to a Karnaugh map of the layout of the particular optic RAM chip 40 being utilized and receives the D-out data in a first-in-first-out (FIFO) memory 200 for processing by the computer resource 70. For a point range sensor a precalibrated line of two rows, such as line 32 is read with 512 or less elements being read in that line. For a line range sensor a precalibrated or preselected series of rows are processed for purposes of determining the profile of the object surface being sensed.

Reading is initiated through command register 175 which with associated logic 201–203 synchronizes the read process with system timing. The row and column counts are entered in a row counter 207 and column counter 209, under control of the address select 142, pins 15 & 14, and counts are processed by address descramble logic 67 including addressable selector 211.

At the same time, the read cycle is established with connected latches 219, 220 which enable eight bit data, corresponding to the D-out signal, to be loaded into shift register 225 under control by counter 227 which is sequentially loaded into the FIFO 200 and connected to the computer resource 70 bus on lines D0–D7.

Because of the topography of the chip a typical read cycle might begin a row 1, column 0 and then jump to row 0, column 1 and then to row 2, column 2. Consequently, to get the 512 pixel readout the circuitry must increment and decrement readings as it processes the pixel data. Consequently, the row and column data parameters are setup with D-latches 229, 231 which feedback the status of the row and column counters 207, 209 into the descramble logic 60 what is actually happening in the system. Using a Karnaugh map to establish the descramble logic 67, the rows, for a row oriented system can be incremented or decremented or kept at the same count. This is accomplished with the descramble logic 67 including an addressable selector 211 which on output pin 4 can disable the row counter so that it does not count or increment it by two from output pin 7. This establishes the ability to count through the nonlinear topography of the RAM chip 40. The columns can be similarly processed with the same circuitry.

The logical to physical mapping of the chip topography also requires additional logic which is accomplished with the exclusive OR gates 215, according to the manufacturer's requirements.

To bring data into the system, flip-flops 219, 220 are provided also subject to the input on the command register 175. The read signal sets up the timing signal on the dual flip-flop latches 219, 220 which allow the D-outs on input pin 15 to be accumulated in the FIFO 200 through the shift register 225.

If a full line of 512 pixel elements is to be read, these pixels are loaded into the FIFO 200, eight at a time through shift register 225 under control of counter 227.

In the event less than 512 pixels are to be read, the shift register is loaded with zeros to complete eight pixels for the last transfer to the FIFO 200 using latches 219, 220 and associated logic to be sure that valid data is received by the FIFO 200 and the computer resource 70. When sequential lines or rows are being read for line range sensing, provision is made to accommodate the change of signal from the complimented D-out signal on the lower half of the array. The row count from row counter 207, on pin 15 is connected to latch 240 which is connected to exclusive OR gate 245. Thus when the Q output is active the exclusive OR gate inverts the data signal to assure continued and active reading of data.

Anytime that a new command is sent out to the command register 175 to tell it to read a new row or column, that is decoded by gate 230 on pin 6 which is connected to OR gate 233 to do a master reset on pin 5 of the FIFO 200 to be sure that previous data from a previous read does not effect the processing of data pursuant to the new command. The same signal clears the eight bit counter and register 227, 225 through NOR gate 239.

Those skilled in the art will recognize from a review of the schematic that other logic, gates and latches, are similarly used to enable the various sequences described. And, as with the multiplexer driver board 45, line drivers 178, 184, 241–243 with line terminating resistors 81 are also preferably utilized for remote operation.

It will also be obvious to those skilled in the art from a review of the interface board that many other and various processing can occur using the controls which are established by this circuitry to selectively read any required data which might be obtained by exposing the optic RAM 40 in the manner described.

Since the interface board is connected to a processing resource 70 such as an IBM computer it will be understood that many and varied processes can be achieved using the processing power of the interfaced computer system 70. A number of routines, however, are included as driver routines which interface directly with the hardware 45, 60 previously described to assure proper operation of the invention. Lower level driver routines are set forth in Appendix A. Higher level routines are set forth in FIGS. 5 a,b, and c.

Referring now to Appendix A the first routine "init-interface" initializes the components on the interface board, checks to see what computer is connected to the interface board and sets up the clock divider for the appropriate computer. The routine initializes and sets up the initial values in all of the onboard registers to initiate processing and sets all lasers 34 to low power.

The second driver routine, "start-exposure", specifies the address of the sensor head that is to be exposed or soaked. The exposure time is also established and whether the routine shall be interrupt driven and return immediately to processing or if the routine should wait until exposure is complete and then return to control of the processor. The next routine entitled "read-detector", is called from the GET-DATA routine of FIG. 5a. This routine reads data, either by row or by column from the detector array 40 into the FIFO buffer 220. The routine under operator control specifies the port to read the data from, the number of pixels to read and the location of the detector array to read.

Also using this routine, the modes, read row and read column, can be specified or the expose and read immediately mode discussed in conjunction with the interface board can be achieved.

Once data is read into the FIFO buffer 200, the routine "read fifo" enters the FIFO 200 data into the computer resource 70 memory so it can be processed. This routine passes a pointer to the buffer to indicate where the data is to be stored.

The balance of the routines set forth in Appendix A control other aspects of the interface board. A "lightselect" routine powers the laser to the operator selected level. A "interrupt control" routine controls which interrupts on the board will be enabled, for example, when an exposure is complete or when an external input has been toggled so that some other processor device can trigger a reading.

Finally, "output" and "input" routines are provided which control, at the user's election, the input and output bits described in connection with the multiplexer driver board or box 45. These routines are provided so that the user of the system can implement a handshake or use the bit commands for other purposes determined by the user. The lower level drivers are normally provided on a diskette to a purchaser of the system so that the purchaser of the system can create their own programming and access the functionability of the system.

Referring now to FIG. 5, higher level routines are shown in flow chart form to obtain and process data from the system.

Figure 5A:
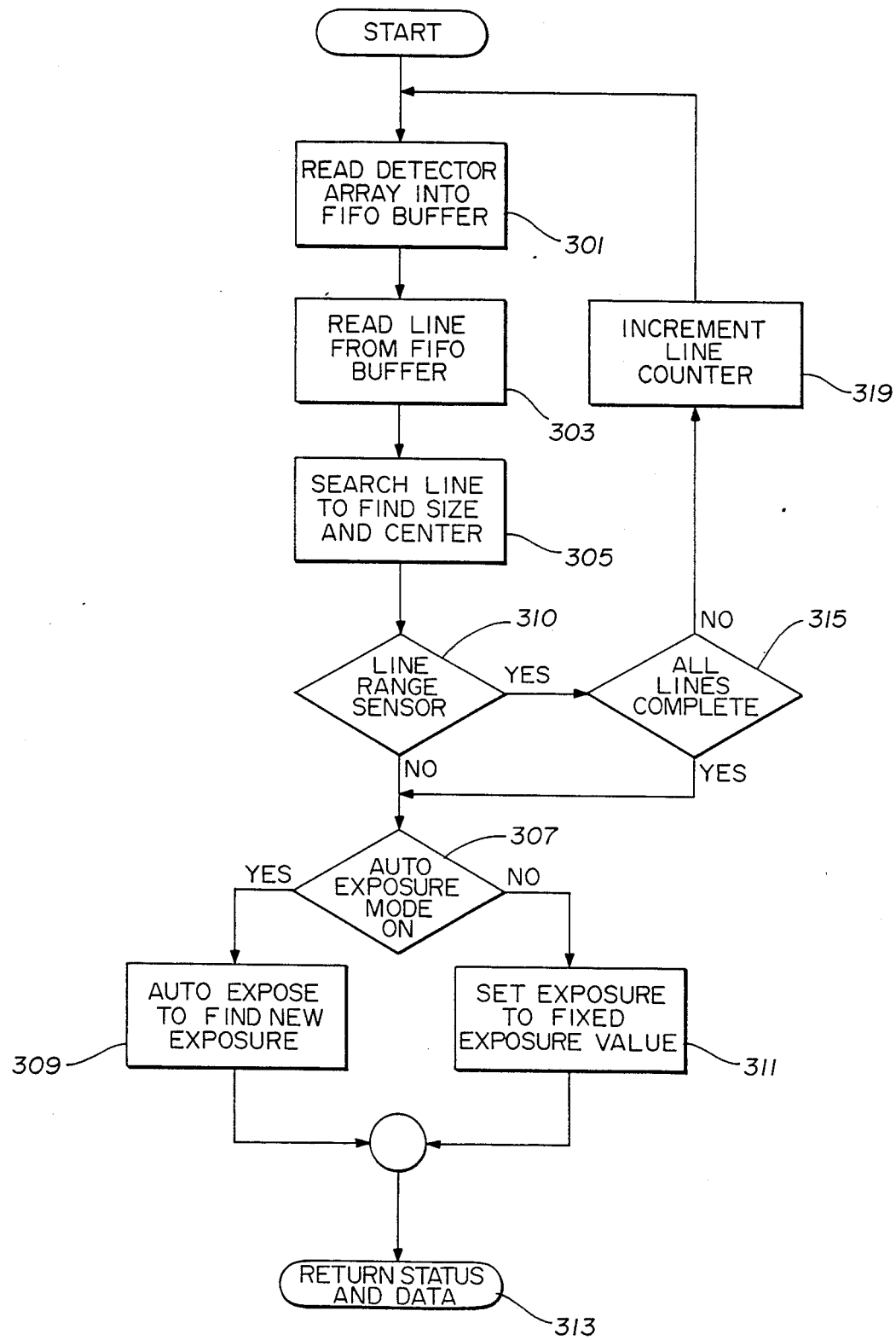
FIG. 5 consisting of FIGS. 5a, 5b and 5c, are flow charts of software used with the invention for purposes described below.

FIG. 5a is the data collection routine which is preferably utilized. This calls the low level drivers discussed above and the routines of FIGS. 5b and 5c, as appropriate.

Referring to FIG. 5a the "read detector" routine 301 is called to store the detector 40 data in the FIFO buffer 200 using the electronic components discussed in connection with FIG. 4.

The line of data is then read from the FIFO buffer 200 in eight bit bytes 303. It will be understood that data can be read from the FIFO 200 at the same time that subsequent data is being entered into the FIFO from the detector array 40. For the line range sensor, each line of interest is read into the computer memory in this fashion.

After the data is in the computer memory, the search line routine 305 is called to determine the spot size and average position to find the center of the spot. This is accomplished with the routine shown in FIG. 5b and discussed below. For the line range sensor, this routine operates on data from each sensor row.

If the optics and circuitry are configured for line range sensing 310, the row counter is incremented 319 and additional rows of data from the detector are read into the computer memory through the FIFO buffer 200 until the data acquisition is complete 315 to enable the system to determine the profile of the object surface.

Figure 5B:
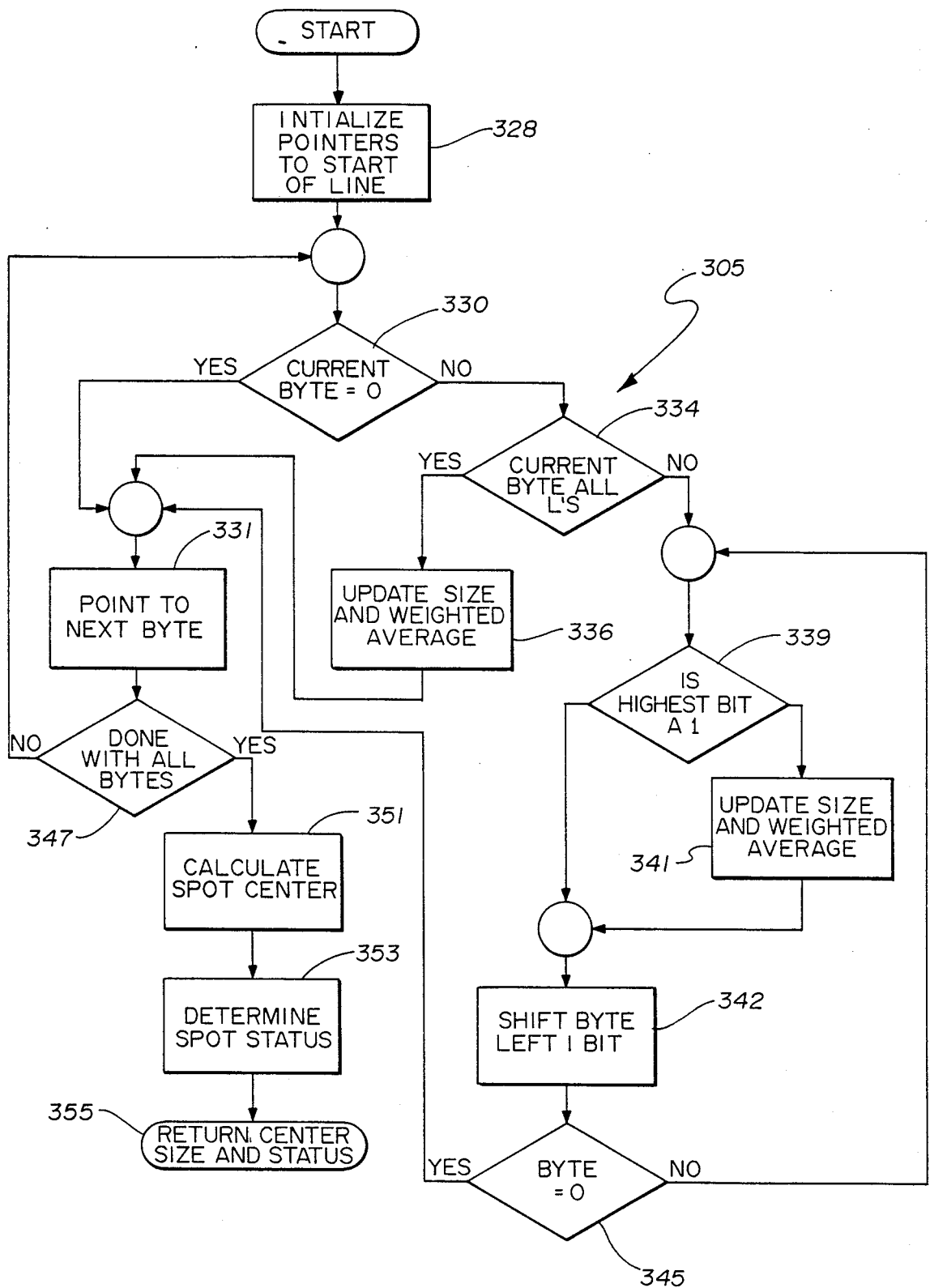
Figure 5C:
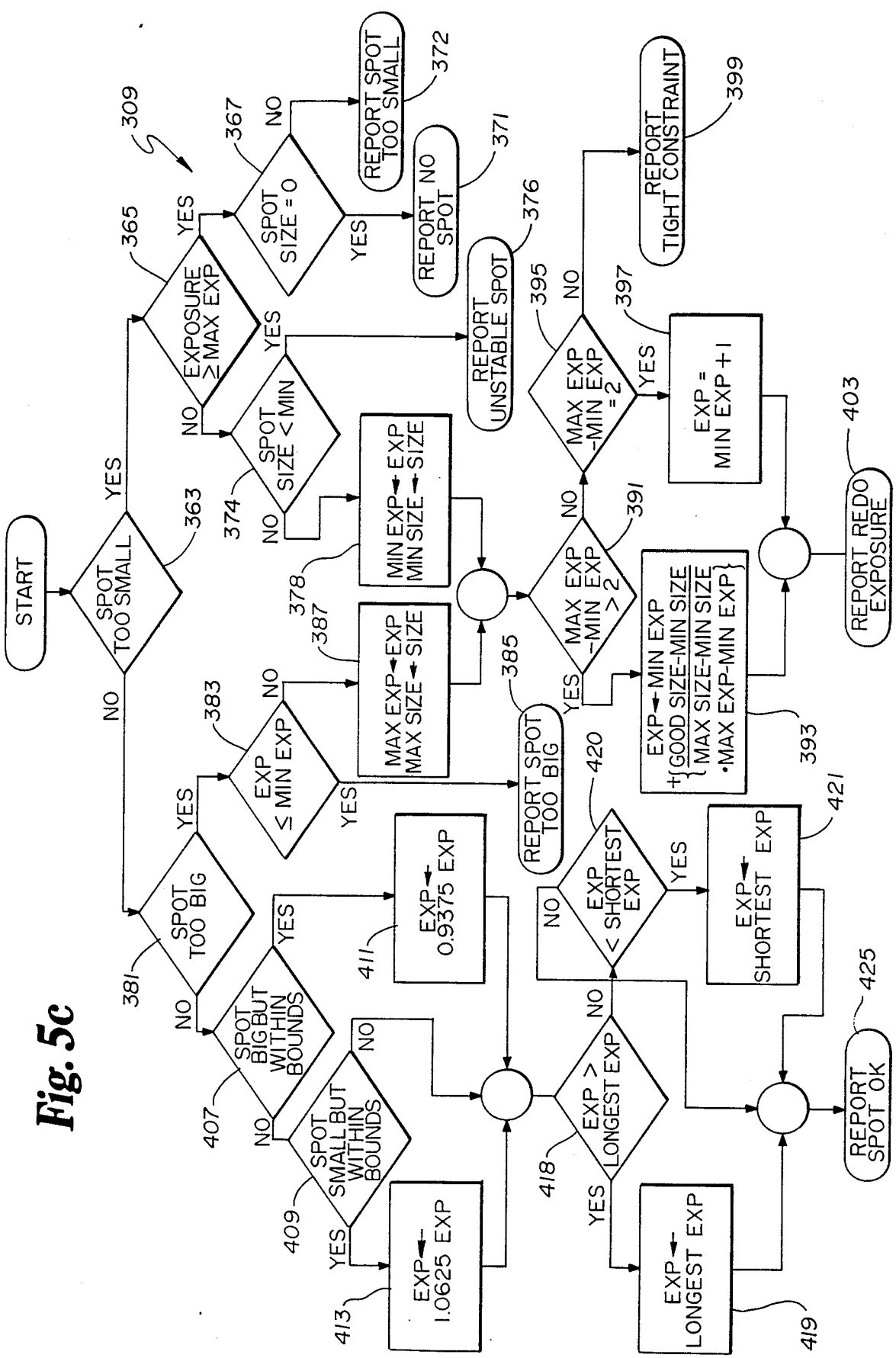

If an auto exposure mode is selected 307, the routine of FIG. 5c 309 is performed to optimize the spot size and adjust it if necessary. For the line range sensor, this routine may operate on the data from one or multiple lines as desired. If the auto expose mode has not been selected, a fixed exposure value entered by the user is set 311. Thereafter, the spot size data status is reported 313 on the CRT screen 123 and the data is displayed thereon and further processed if desired by the user of the system 30 for a point range sensor.

Upon completion, the status and the data is displayed 313 and can be processed further by the user of the system.

Referring now to FIG. 5b, the search line routine 305 is shown which determines spot size and average position. At the time the search line routine 305 has been called the pixels for an entire line have been read into the computer 70 memory in eight bit bytes from the FIFO buffer 200. The logic of the buffer 200 contents will be zero up until the point when the laser beam hit pixel elements, will be ones for the duration of the spot size, and thereafter will again be zeros as the remaining pixels elements were not soaked or exposed by the laser beam. Therefore, the points for processing are initialized at the start of the line 328 and the data is processed by eight bit bytes. If the current byte being analyzed is all zero 330, the spot has not been located and the pointer is moved to the next byte 331 for reading. If the current byte is not equal to zero, a check is made to see if it is all ones 334. If true, the size and weighted average of the spot is updated 336 and the next byte is processed 331. If the byte is not all ones, that is some pixels on and some off, the routine 305 loops through the entire byte one pixel at a time 339, 341, 342, 339 until all remaining bits are zero 345. After all bytes and bits have been processed 347, the spot center can be calculated 351 and the spot status, that is no spot too large, too small and the spot center can be determined stored and processed 353 and the status reported 355 to the user of the system.

The auto expose routine is run at the operator's election as indicated in FIG. 5a. The automatic exposure control routine as shown in FIG. 5c. It would normally be run when an object is being scanned with changing reflectivity. For example, when moving a white object onto a dark table, the exposure time would be automatically increased so that the spot size stays the same.

As indicated above, the automatic exposure control routine is run after the processor 70 has already determined the center position and size of the spot.

The user specifies through a menu what the desired spot size is and what range of spots are allowable. This software then checks to see whether the spot that has been seen with the search line routine is within those bounds. If the spot is too small, 363, the current exposure is checked, 365, to see if the exposure is larger or equal to the longest possible exposure. If it is, 367, nothing can be done and a report is made that there is no spot at all 371 or that the spot is too small 372. However, if the exposure is less than the maximum possible exposure, a check 374 is made to see if the spot size is smaller than the smallest spot processed previously. If this is the case, this normally indicates that either the object surface is changing or something is happening to affect the measurement. If this occurs, a CRT report 376 is made that the spot is unstable and the routine is reset.

If on the other hand the spot size is greater than the smallest previous spot, the current exposure is set as the minimum allowable exposure 378. Similarly, if the spot is too large 381, a check 383 is made to see if the exposure time is as small as possible. If true, the spot is reported to be too big 385. If not, the current spot size is designated the maximum size and the current exposure is set as the maximum exposure time 387.

Thereafter, a check 391 is made to determine whether the range between the longest and shortest exposure is larger than two units of time. If it is, a linear interprelation is performed 393 to produce the next exposure. This interprelation normally determines what exposure time should produce the correct spot size.

If the difference between the longest and shortest exposure time is two 395, the exposure is set to be half way between the two time units 397. If it is less than two, it cannot be controlled and a report 399 is made to the operator on the CRT screen 123 that the user supplied constraints are too tight.

After the adjustment to exposure time, a CRT report 403 is made to the operator that the exposure should be redone with the new exposure time to get better data.

If a spot is within the bounds that the user has specified although slightly larger 407 or slightly smaller 409 than desired, the exposure time is decreased 411 or increased 413 by a small amount, for example, 1/16th of its current value. These exposure times are then re-checked 418–421 to make sure that the value is still within bounds and the spot is reported as being okay 425.

The small adjustment of exposure for a spot size that is within bounds, is made to ensure that if the surface reflectivity changes slowly over time, that the spot is maintained as close to optimal as possible. If this does not occur, good exposures would be produced while the surface changes slowly and the exposure time would not change until the spot size grew or reduced out of bounds. At that time the exposure time would change drastically to compensate rather than smoothly following the surface. The minor adjustment to the exposure time allows the spot size to fluctuate with the surface and enables repeatable and continuing valid data from the system.

Using the system as shown and described a resolution of thirty microinches (0.75 micrometers) is achievable with a range of 12 millinches (0.5 millimeters) and a resolution of 1600 microinches (40 micrometers) is achievable with a range of 640 millinches (16 millimeters). The spot size or footprint of the system is normally 1 millinch (25 micrometers) spot size on the object. A preferred exposure time can be varied between 100 microseconds to one second and the total dynamic range, including exposure time and variation in laser diode power, is greater than $10^7$ to respond to object reflectivity variations of the object surface.

Processing time using an IBM personal computer AT is on the order of two milliseconds providing in excess of 500 readings per second if desired. As a consequence of the preferred optical system, the standoff distance can be as small as 0.2 inches and as large as 2.5 inches (30 millimeters) while maintaining a small sensor head size and a total sensor head weight of four ounces. The same ranges and precision are achieved with the system configured as a line range sensor. Height resolution for line range sensors can vary between 30 to 400 microinches and lateral resolution varies between 100 to 1200 microinches. As set forth in detail above, both line range sensing and point range sensing heads are supported by the same interface board for added convenience and savings.

It will be clear to those skilled in the art that many and varied modifications and variations can be made in the specific embodiments shown and described as point range sensors or line range sensors of this invention. All such variations and modifications are intended to be within the scope of the appended claims.

APPENDIX A

```
/*!
Object Code Module DRIVERS.0 - Low Level Interface Board Drivers
        Version : 3.0.0
        JEB - 19/Mar/86 unsigned control;      Module global which contains the contents of
                                the control register.

*/ include <stdio.h>
include <drivers.h>
include <bios.h> unsigned control;   /* contents of control register */
unsigned command;   /* contents of command register */

/*!
************************************************************************ void init_interface();

This routine initializes all registers on the interface board.
        It must be called at least once prior to the first use of any
        of the following driver routines.

The calling of this routine sets all PRS sensors' laser outputs
        well below Class I power levels.
```

Uses module global variables - control & command
*/
init_interface()
{
int ratio;          /* Timing divisor to be loaded for 100 us tics */ asm
            jmp ab1                         ;imbedded copyright
            db  '(c) 1986 CyberOptics'
ab1:

ratio = 120;
if (_peek(ID_BYTE,ID_SEGMENT) == AT_ID) ratio = 150;
control = 0;
command = 0;
outp(CONTROL_REG,control);
outp(COUNT_MODE_REG,(SEL_DIV | MOD_CLOCK_DIV | LOAD_WORD));
outp(COUNT_MODE_REG,(SEL_SOAK | MOD_INT_GEN | LOAD_WORD));
outp(COUNT_MODE_REG,(SEL_LENGTH | MOD_INT_GEN | LOAD_WORD));
outp(SOAK_DIVISOR,ratio);
outp(SOAK_DIVISOR,0);
outp(COMMAND_REG,command);
}

/*!

void start_exposure(port, time, wait_flag)

unsigned port, time, wait_flag;

This routine starts a new exposure of the detector array that is
            connected to the specified port. The duration of the exposure is
            equal to (time * 0.1 mSec).

If wait_flag is a non-zero value, the routine will not return
            until the new exposure is completed. If wait_flag is equal to zero,
            the routine will return immediately after starting the new exposure.
            The user should only pass wait_flag = 0 if the user's program
            responds to an EXPOSURE_END hardware interrupt.

0 <= port <= 15
            1 <= time <= 10000

Uses module global variable - command
*/
start_exposure(port, time, wait_flag)
unsigned port, time, wait_flag;
{
asm
            jmp aa0                         ;imbedded copyright
            db  '(c) 1986 CyberOptics' aa0:    mov dx,778              ;dx = LENGTH_COUNTER
            mov ax,dx           ;preset the counter
            out dx,al
            out dx,al

```
            mov ax,[bp]+4         ;get the port number
            and al,0fh            ;strip off the upper nibble
            mov bl,al             ;save it for later
            mov dx,771            ;dx = COMMAND_REG
            out dx,al             ;clear this head mov ax,[bp]+6         ;get the soak time
            cmp ax,0              ;check for a zero soak time
            jnz qq1
            inc ax
qq1:    mov dx,777                ;dx = SOAK_COUNTER
            out dx,al             ;al = time%256
            mov al,ah             ;al = time/256
            out dx,al mov al,bl             ;recall the port number
            or  al,32             ;set the soak bit
            mov command_,al       ;save the contents
            mov dx,771            ;dx = COMMAND_REG
            out dx,al             ;send the soak command mov ax,[bp]+8         ;get the wait flag
            cmp ax,0              ;check if it is zero
            jz  aa2               ;branch if no waiting
            mov dx,773            ;dx = STATUS_REG aa1:    in al,dx                  ;wait for end of soak
            test al,2
            jz  aa1 aa2:

}

/*!
************************************************************************
void read_detector(port, length, row, column, mode, time)

unsigned port, length, row, column, mode, time;

This routine reads either a row or column of pixels from the
            specified detector into the interface board's FIFO buffer.
            The number of pixels read is specified by length.

The user can use the COUNT_COMPLETE hardware interrupt to signal
            that all the pixels have been read from the detector.

The user can select several options when using this routine.

mode codes:     MODIFY          read the data and reset pixels
                                EXPOSE          expose the array before reading
                                READ_ROW        read a row of pixels
                                READ_COLUMN     read a column of pixels Note: READ_ROW and READ_COLUMN should not be set at the same time!

If the EXPOSE option has been selected, the duration of the
``` exposure is equal to (time * 0.1mSec). When not using this option, the time value is ignored. The use of this mode will generate an EXPOSURE_END hardware interrupt, as well as the COUNT_COMPLETE interrupt.

```
    0 <= port <= 15
    1 <= time <= 10000

If using the READ_ROW mode:
    0 <= row <= 127
    0 <= column <= 511
    2 <= length <= 512

If using the READ_COLUMN mode:
    0 <= row <= 255
    0 <= column <= 255
    2 <= length <= 256

*/ read_detector(port, length, row, column, mode, time)
unsigned port, length, row, column, mode, time;
{
asm
              jmp bb0                         ;imbedded copyright
              db  '(c) 1986 CyberOptics' bb0:   mov ax,[bp]+4           ;get the port number
              and al,0fh                      ;strip off the upper nibble
              mov si,ax                       ;save it for later
              mov dx,771                      ;dx = COMMAND_REG
              out dx,al                       ;clear this head mov bx,[bp]+12          ;get the mode
              test bl,32                      ;issue a soak?
              jz   bb1                        ;branch if no soak mov ax,[bp]+14          ;get the soak time
              mov dx,777                      ;dx = SOAK_COUNTER
              out dx,al                       ;al = time%256
              mov al,ah                       ;al = time/256
              out dx,al
bb1:   mov ax,[bp]+8           ;get the row
              shl ax,1                        ;row = 2*row
              mov cx,[bp]+10          ;get the column
              mov di,cx                       ;make a copy
              and cl,3                        ;column%4
              cmp cl,2                        ;if column%4 = 2, do nothing
              je  bb3
              jb  bb2
              inc ax                          ;if column%4 < 2, row++
bb2:   inc ax                          ;else row += 2
bb3:   mov dx,768              ;dx = ROW_COUNTER
              out dx,al                       ;set the starting row mov ax,di                       ;recall the column
```

```
                shr ax,1                ;column = column/2
                jc  bb4                 ;do nothing if odd column
                inc ax                  ;else column++
bb4:    inc dx                          ;dx = COLUMN_COUNTER
                out dx,al               ;set the starting column mov ax,[bp]+6           ;get the length
                mov dx,778              ;dx = LENGTH_COUNTER
                out dx,al               ;length%256
                mov al,ah               ;length/256
                out dx,al mov ax,si               ;recall the port number
                and bl,0F0h             ;keep only mode bits
                or  al,bl               ;combine with the port number
                mov command_,al         ;save the contents
                mov dx,771              ;dx = COMMAND_REG
                out dx,al               ;issue the new command
    }
}

/*!
************************************************************************ void read_fifo(pix_data, length);

char *pix_data;
unsigned length;

This routine reads data from the FIFO into a data array (pixels
                are packed 8 per char). It assumes that a read_detector has
                already been done. The user should use the same value of length
                when calling this function as was passed to read_detector to prevent
                leaving 'left-over' data in the FIFO.

dim of pix_data >= (length + 7)/8

Uses module global variable - command
*/
read_fifo(pix_data,length)
unsigned length;
char *pix_data;
{ asm
                jmp cc0                 ;imbedded copyright
                db  '(c) 1986 CyberOptics'
cc0:    mov cx,[bp]+6                   ;get the length
                add cx,7                ;length = (length+7)/8
                shr cx,1
                shr cx,1
                shr cx,1                ;cx is the loop counter
                mov si,[bp]+4           ;si points to the pixel array
                mov dx,773              ;dx = STATUS_REG cc1:    in  al,dx                       ;try to sneak data out while FIFO is loading
```

```
            test al,4              ;if the count is complete, go to
            jnz cc2                ;the high speed data collection loop shr al,1               ;look for the FIFO empty flag
            jc  cc1                ;branch if no data ready dec dx                 ;set dx = DATA_REG
            in  al,dx              ;read a byte from the FIFO
            mov [si],al            ;store it in memory
            inc si                 ;advance the array pointer
            inc dx                 ;return dx = STATUS_REG
            loop cc1
            jmp cc4                ;shouldn't need this, but just in case ...

cc2:    dec dx                     ;dx = DATA_REG
cc3:    in  al,dx                  ;read in the data
            mov [si],al
            inc si
            loop cc3 cc4:    mov dx,778                 ;dx = LENGTH_COUNTER
            mov ax,dx              ;preset the counter
            out dx,al
            out dx,al mov al,command_        ;recall the command
            and al,0fh             ;keep the head number
            mov dx,771             ;dx = COMMAND_REG
            out dx,al              ;re-establish the head number
    #
    }
```

```
/*
***************************************************************** void light_select(pattern);

int pattern;

This routine is used to set lighting pattern for the 2-D Camera
            and the laser intensity for the PRS Sensor.

0 <= pattern <= 31  for the 2-D Camera
            0 <= pattern <= 7   for the PRS Sensor Uses module global variable - control
*/
light_select(pattern)
int pattern;
{
asm
            jmp dd0                ;imbedded copyright
            db  '(c) 1986 CyberOptics'
dd0:

control = (control & (~LIGHT_CONTROL)) | (pattern & LIGHT_CONTROL);
outp(CONTROL_REG,control);
```

```
}
/*!
*************************************************************** void interrupt_control(internal, external);

int internal, external;

This routine enables/disables interrupts from the interface board.

internal enables both the EXPOSURE_END and COUNT_COMPLETE interrupts
            external enables an external interrupt.

1 = enable
            0 = disable

Uses module global variable - control

*/
interrupt_control(internal,external)
int internal,external;
{
asm
            jmp ee0                         ;imbedded copyright
            db  '(c) 1986 CyberOptics'
ee0:

control = control & (~(ENABLE_EXT_INT | ENABLE_INT_INT));
if (internal != 0) control = control | ENABLE_INT_INT;
if (external != 0) control = control | ENABLE_EXT_INT;
outp(CONTROL_REG,control);
}

/*!
*************************************************************** void output(value);

int value;

This routine controls the user's output on the multiplexer/driver
            box. If value is equal to zero, a digital '0' will appear
            at the output; otherwise, the output will be set to '1'.

Uses module global variable - control

*/
output(value)
int value;
{
asm
            jmp ff0                         ;imbedded copyright
            db  '(c) 1986 CyberOptics'
ff0:

if (value == 0) control &= ~USER_OUTPUT;
else control |= USER_OUTPUT;
```

```
outp(CONTROL_REG,control);
}
/*!
************************************************************ int input(channel);

int channel;

This routine returns the current input at the specified user's
        input channel. Channel 1 functions strictly as a digital input,
        whereas, Channel 0 can also function as an external interrupt.

Channel = 0,1

*/
input(channel)
int channel;
{
int temp;
#asm
        jmp gg0                    ;imbedded copyright
        db  '(c) 1986 CyberOptics'
gg0:

temp = _inb(STATUS_REG);
if (channel == 0) temp &= EXT_INT;
else temp &= EXT_INP;
return(temp && 1);
}
```

We claim:

1. A range sensor for determining the distance to an object surface comprising:
   a light source comprising a laser diode;
   means for focusing the light source on the object surface;
   means for detecting the light beam reflected from the object surface;
   the detecting means comprising a plurality of light detecting elements;
   means for exposing the detector to the reflected light beam for a preselected exposure time;
   means for reading the data from the detector means caused by the exposure of the detector means to the light beam; and
   processing means for processing the data to determine the range of the object surface.

2. The range sensor of claim 1 wherein:
   the range sensor is configured to be a point range sensor;
   the detecting means is contained in a sensor head;
   the focusing means comprises means for focusing a point of light on the object surface; and
   the processing means comprises means to determine the distance of the object surface from the sensor head.

3. The range sensor of claim 1 wherein the sensor further comprises means for varying the intensity of the light source.

4. The range sensor of claim 1 wherein the laser power can be varied over a range of 1000 to 1.

5. The range sensor of claim 1 wherein:
   the range sensor is configured to be a line range sensor;
   the means for focusing light on the object surface comprises means for focusing a line of light on the object surface; and
   the processing means comprises means for determining the profile of the object surface.

6. The range sensor of claim 5 wherein the detecting means comprises an N×M detector array arranged in rows and columns and wherein the reading means comprises means for selectively reading various rows or columns of the N×M array.

7. The range sensor of claim 1 wherein the detecting means comprises an optic random access memory.

8. The range sensor of claim 7 wherein the random access memory is a dynamic random access memory.

9. The range sensor of claim 1 wherein the means for detecting the light being reflected from the object surface comprises an anamorphic optical system.

10. The range sensor of claim 9 wherein the anamorphic optical system comprises a plurality of prisms.

11. The range sensor of claim 9 wherein the anamorphic optical system comprises two prisms, each of which anamorphically magnifies the light beam in substantially the same amount and wherein the two prisms are oriented in opposition to each other so that variations in dispersion due to wave length changes and distortions in magnification are offset.

12. The range sensor of claim 1 wherein the range sensor comprises a plurality of sensor heads, each sensor head comprising a laser light source; means for focusing the light source on the object surface; and means for detecting the light beam reflected from the object surface; and wherein the range sensor further comprises multiplexing means to selectively address any one of the plurality of sensor heads.

13. The range sensor of claim 12 wherein the multiplexing means comprises means for controlling the power to any one of the light sources.

14. The range sensor of claim 12 wherein the multiplexing means comprises means for delaying energization of any one of the light sources.

15. The range sensor of claim 12 wherein the range sensor further comprises processing means connected to the multiplexing means to process the data received from the detector means and wherein the multiplexing means further comprises driver means so that each of the sensor heads can be located at a location which is remote from the processing means.

16. The range sensor of claim 1 wherein the range sensor further comprises processing means for controlling the operation of the range sensor.

17. The range sensor of claim 16 wherein the processing means comprises means for selectively reading all or a selected portion of the detecting means.

18. The range sensor of claim 16 wherein the detecting means comprises a detector array and wherein the processing means comprises means for periodically refreshing the detector array.

19. The range sensors of claim 16 wherein the detector means comprises a detector array and wherein the processing means comprises means for reading the data stored in the detector array and means for storing the data from the detector array.

20. The range sensor of claim 16 wherein the detecting means comprises an N×M detector array having light sensitive elements arranged in rows and columns and wherein the processing means comprises means for sequentially reading various rows of the detector array for increased resolution.

21. The range sensor of claim 16 wherein the detecting means comprises an N×M detector array having light sensitive elements arranged in rows and columns and wherein the processing means comprises means for sequentially reading various columns of the detector array for increased resolution.

22. The range sensor of claim 16 wherein the detecting means comprises an N×M detector array having a logical to physical layout of light sensitive elements and wherein the processing means comprises means for controlling the reading of the elements according to the logical to physical layout of the detector array.

23. The range sensor of claim 16 wherein the processing means comprises means for preselecting the exposure time of the detecting means.

24. The range sensor of claim 23 wherein the exposure time can be varied over a range of $10^4$.

25. The range sensor of claim 16 wherein the processing means comprises software means for controlling the reading of data from the detecting means.

26. The range sensor of claim 25 wherein the software means comprises means for causing the array to be read.

27. The range sensor of claim 25 wherein the software means comprises means for storing the data from the detecting means in the processing means.

28. The range sensor of claim 25 wherein the software means comprises means for controlling the intensity of light from the light source.

29. The range sensor of claim 25 wherein the software means comprises means for controlling the exposure time of the detecting means to the light source.

30. The range sensor of claim 25 wherein the processing means comprises means for creating an image of the focused light beam and wherein the software means comprises means for adjusting the spot size of the image.

31. The range sensor of claim 25 wherein the range sensor further comprises means for displaying the data and wherein the software means comprises means for processsing the data read from the detector array for display.

32. The range sensor of claim 31 wherein the software means comprises means for rejecting data from selected areas of the detecting means after the data is displayed to eliminate erroneous readings caused by multiple reflections from the object surface.

33. A system including processing means for determining the range of an object surface comprising:
a plurality of sensors, each sensor comprising:
a laser light source which emits both visible and infrared radiation;
means for varying the intensity of the light source;
means for focusing the light source onto an object surface;
an anamorphic optical system comprising a plurality of prisms for receiving light reflected from the object source and anamorphically magnifying the reflected light beam in an orthogonal plane; and
an optical detector comprising a plurality of light detecting elements configured in an N×M pixel array, each pixel element being selectably addressable;
multiplexing means connected to the plurality of sensor heads the multiplexing means comprising:
means for selectably addressing any one of the plurality of sensor heads;
means for varying power to the light source in the selected sensor head;
means for delaying energization of the light source for a preselected period of time; and
means enabling the sensor to be remote from the processing means;
the processing means being connected to the sensor heads through the multiplexing means, the processing means including software means and means for displaying the data and further comprising:
means for controlling the exposure time of the detector array to the focused light beam;
means for selectively reading all or a selected portion of the detector array;
means for refreshing the detector array; and
means for storing data from the detector array;
the software means being used to control the operation of the processing means and comprising:
means for adjusting the intensity of the light;
means for adjusting the exposure time of the light source;
means for causing the detector array to be read;
means for storing the data from the detector array;
means for determining the spot size and spot location on the detector array;
means for adjusting the spot size of the light reflected onto the detector array; and
means for calculating the range of the object surface and for displaying the data read from the detector array.

* * * * *